US012596241B2

(12) United States Patent
Obikane

(10) Patent No.: US 12,596,241 B2
(45) Date of Patent: Apr. 7, 2026

(54) ZOOM LENS AND CAMERA DEVICE WITH ZOOM LENS

(71) Applicant: BEIJING XIAOMI MOBILE SOFTWARE CO., LTD., Beijing (CN)

(72) Inventor: Yasuhiko Obikane, Tokyo (JP)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 703 days.

(21) Appl. No.: 17/908,908

(22) PCT Filed: Apr. 21, 2021

(86) PCT No.: PCT/CN2021/088809
§ 371 (c)(1),
(2) Date: Sep. 1, 2022

(87) PCT Pub. No.: WO2022/222085
PCT Pub. Date: Oct. 27, 2022

(65) Prior Publication Data

US 2023/0359006 A1    Nov. 9, 2023
US 2025/0102784 A2    Mar. 27, 2025

(51) Int. Cl.
*G02B 15/177* (2006.01)
*G02B 13/02* (2006.01)
(Continued)

(52) U.S. Cl.
CPC ........... *G02B 15/177* (2013.01); *G02B 13/02* (2013.01); *G02B 13/06* (2013.01); *G02B 15/20* (2013.01)

(58) Field of Classification Search
CPC ...... G02B 15/177; G02B 13/02; G02B 13/06; G02B 15/20; G02B 13/0065; G02B 13/18; G02B 15/16; G03B 17/17
See application file for complete search history.

(56) References Cited

U.S. PATENT DOCUMENTS 7,423,810 B2    9/2008    Bito et al.
8,179,608 B2    5/2012    Wada et al.
(Continued)

FOREIGN PATENT DOCUMENTS

CN    101013192 A    8/2007
CN    102004303 A    4/2011
(Continued)

OTHER PUBLICATIONS

OA for JP application 2021-532297 dated Oct. 6, 2023 with English translation, 9 pages.
(Continued)

*Primary Examiner* — Bumsuk Won
*Assistant Examiner* — Ray Alexander Dean
(74) *Attorney, Agent, or Firm* — Arch & Lake LLP; Hao Tan; Shen Wang

(57) ABSTRACT

A zoom lens is retractable and includes a first lens group, a second lens group and a P-lens group from an object side to an image side along an optical axis, the first lens group has a negative refractive power, and the second lens group has a reflective optical element bending an optical axis. During retraction, the second lens group moves along the optical axis to an image side, and at least a part of the first lens group is retracted into a space generated by the movement of the second lens group.

18 Claims, 29 Drawing Sheets

(51) Int. Cl.
    *G02B 13/06*       (2006.01)
    *G02B 15/20*       (2006.01)

(56)             References Cited

U.S. PATENT DOCUMENTS

| | | | |
|---|---|---|---|
| 8,339,504 | B2 | 12/2012 | Uehara et al. |
| 8,610,816 | B2 | 12/2013 | Uehara et al. |
| 8,953,251 | B2 | 2/2015 | Okada |
| 2004/0179273 | A1 | 9/2004 | Ishikawa et al. |
| 2007/0091200 | A1* | 4/2007 | Yamaguchi .... G02B 15/144113 |
| | | | 348/E5.045 |
| 2007/0183043 | A1 | 8/2007 | Bito et al. |
| 2010/0141827 | A1 | 6/2010 | Uehara et al. |
| 2011/0051257 | A1 | 3/2011 | Nada et al. |
| 2013/0033758 | A1 | 2/2013 | Okada |
| 2013/0076969 | A1 | 3/2013 | Uehara et al. |
| 2021/0333517 | A1 | 10/2021 | Li et al. |

FOREIGN PATENT DOCUMENTS

| | | | | | |
|---|---|---|---|---|---|
| CN | 102914855 | A | 2/2013 | | |
| CN | 101750717 | A | 6/2020 | | |
| CN | 111399180 | A | 7/2020 | | |
| JP | 2006154702 | A | * | 6/2006 | ......... G02B 13/0025 |
| JP | 2007139863 | A | | 6/2007 | |
| JP | 2007212963 | A | | 8/2007 | |
| JP | 2017040735 | A | | 2/2017 | |
| JP | 2017116679 | A | | 6/2017 | |
| JP | 2019053154 | A | | 4/2019 | |
| WO | WO-2005091043 | A1 | * | 9/2005 | ............. H04N 23/55 |

OTHER PUBLICATIONS

First Office Action of Japanese Application No. 2021-532297 dated Jun. 23, 2023 with English translation, (8p).

* cited by examiner

ZOOM LENS AND CAMERA DEVICE WITH ZOOM LENS

CROSS-REFERENCE TO RELATED APPLICATIONS

The present application is a U.S. national phase of International Application No. PCT/CN2021/088809, filed on Apr. 21, 2021, the contents of all of which are incorporated herein by reference in their entireties for all purpose.

TECHNICAL FIELD

The present disclosure relates to a zoom lens with a plurality of lens groups and a camera device with the zoom lens.

BACKGROUND

There is a need for an existing camera device of a mobile apparatus such as a smart phone to be equipped with a zoom lens.

SUMMARY

Embodiments of the present disclosure provide a zoom lens, and the zoom lens is retractable. The zoom lens includes: a first lens group, a second lens group and a P-lens group sequentially from an object side to an image side along an optical axis. The first lens group has a negative refractive power; the second lens group has a reflective optical element bending the optical axis; and during retraction, the second lens group moves along the optical axis to the image side, and at least a part of the first lens group is retracted into a space generated by the movement of the second lens group.

Embodiments of the present disclosure also provide a camera device. The camera device includes a zoom lens and an imaging element arranged at an image plan position of the zoom lens. The zoom lens is retractable and includes: a first lens group, a second lens group and a P-lens group sequentially from an object side to an image side along an optical axis. The first lens group has a negative refractive power; the second lens group has a reflective optical element bending the optical axis; and during retraction, the second lens group moves along the optical axis to the image side, and at least a part of the first lens group is retracted into a space generated by the movement of the second lens group.

3

Figures 23A, 23B, 23C:
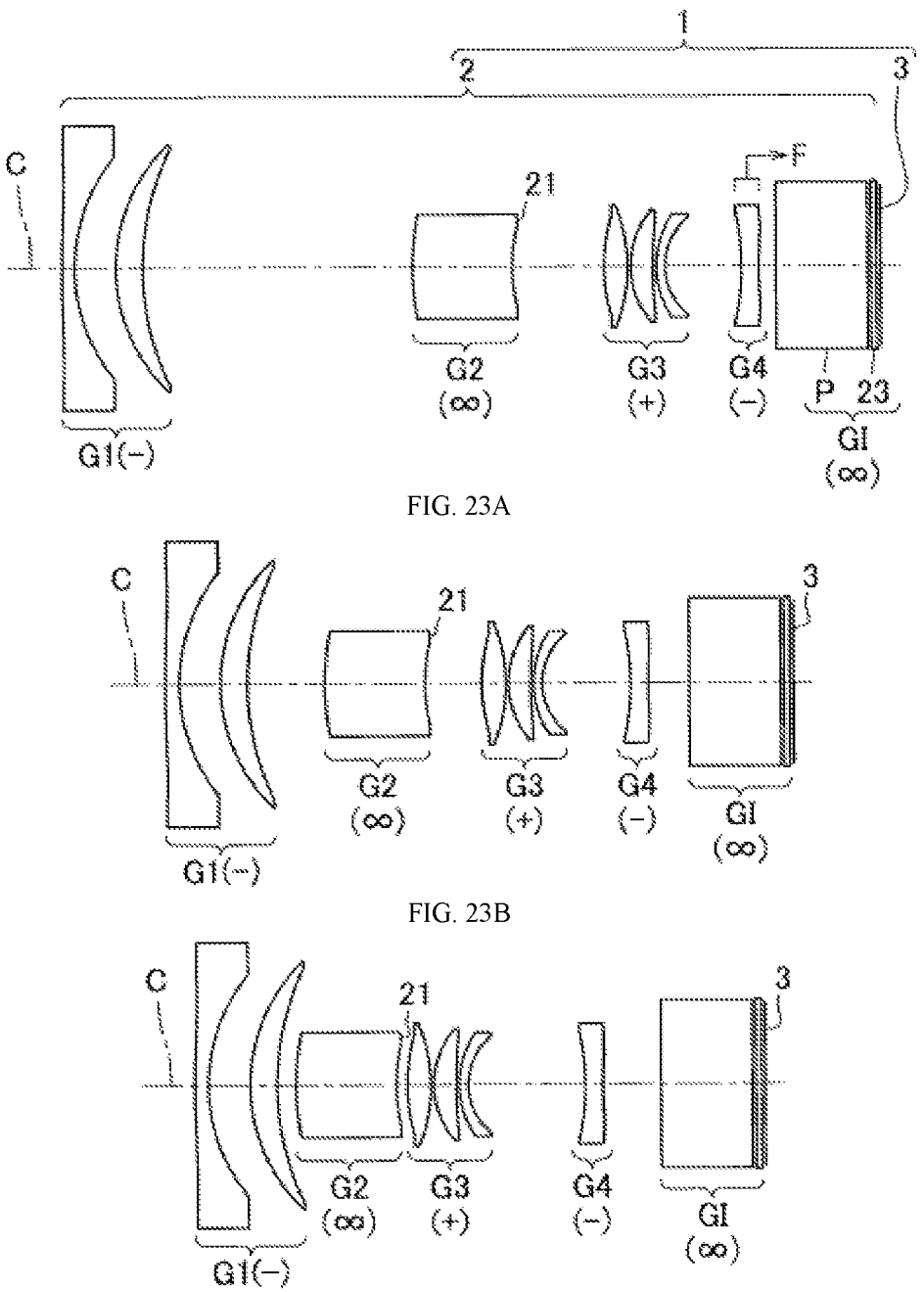
FIG. 23A is a lens structure diagram of a zoom lens according to embodiment 6 in a wide-angle state.
FIG. 23B is a lens structure diagram of a zoom lens according to embodiment 6 in an intermediate focus position state.

FIG. 23C is a lens structure diagram of a zoom lens according to embodiment 6 in a telephoto state.

Figure 24:
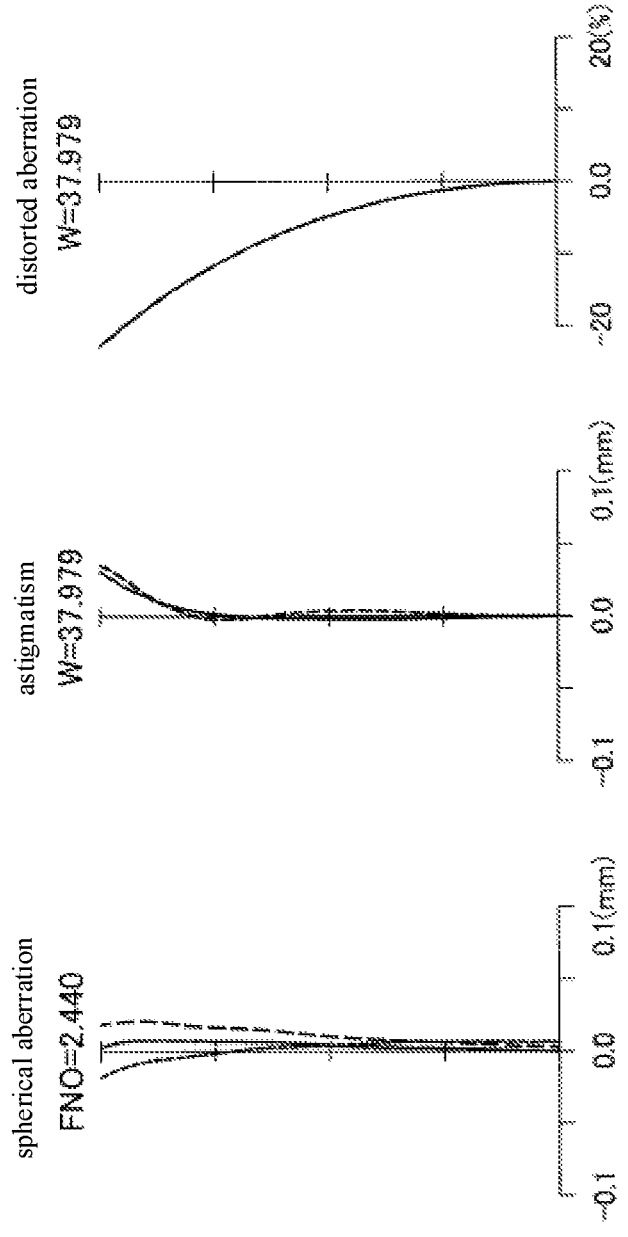

FIG. 24 is a longitudinal aberration diagram of a zoom lens according to embodiment 6 in a wide-angle state.

Figure 25:
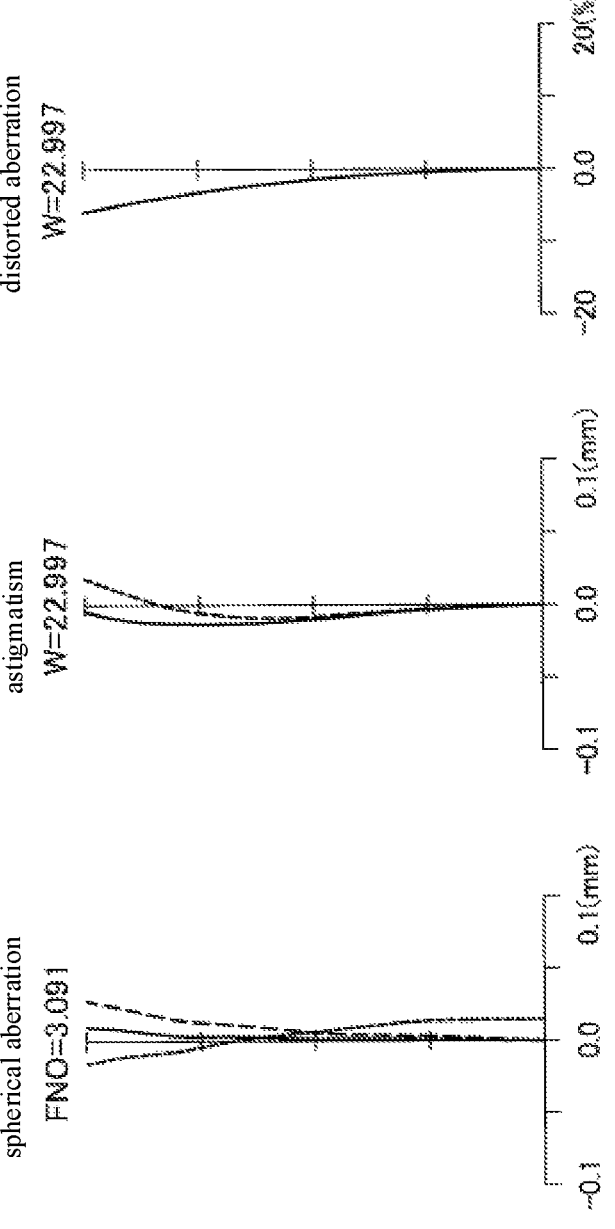

FIG. 25 is a longitudinal aberration diagram of a zoom lens according to embodiment 6 in an intermediate focus position state.

Figure 26:
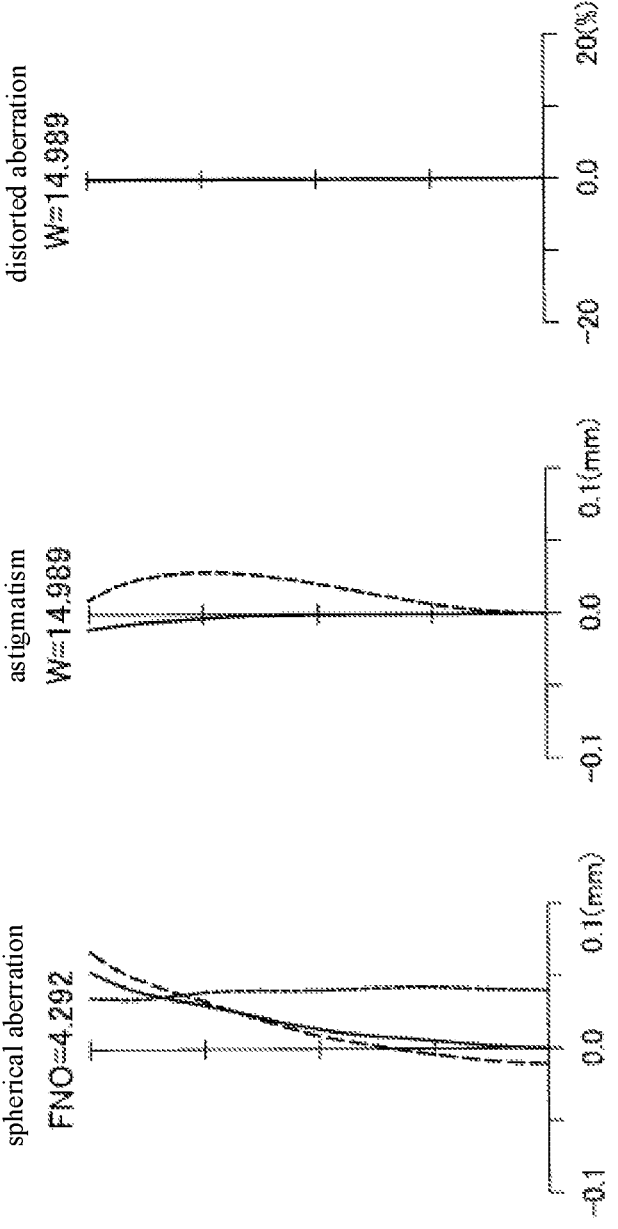

FIG. 26 is a longitudinal aberration diagram of a zoom lens according to embodiment 6 in a telephoto state.

Figures 27A, 27B, 27C:
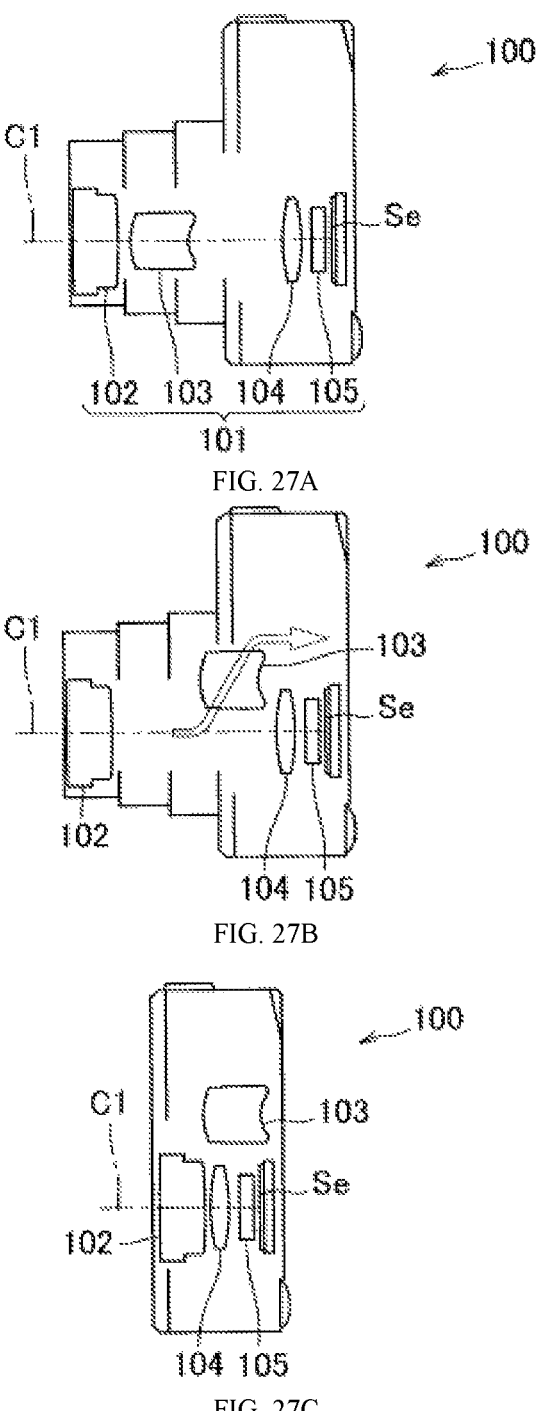

FIG. 27A is a schematic view showing a configuration of a camera device, and is a view showing an imaging state.

FIG. 27B is a schematic view showing a configuration of a camera device, and is a view showing a halfway state of storing a zoom lens.

FIG. 27C is a schematic view showing a configuration of a camera device, and is a view showing a state in which a zoom lens is stored.

Figure 28:
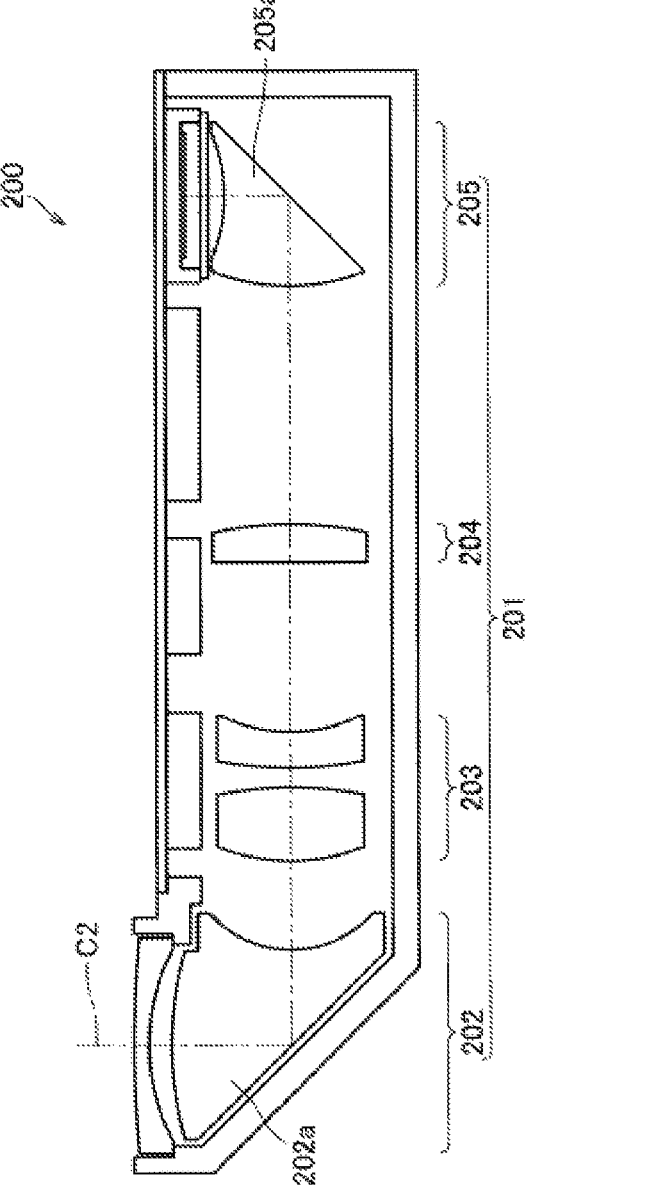

FIG. 28 is a schematic view showing a configuration of a camera device.

Figures 29A, 29B:
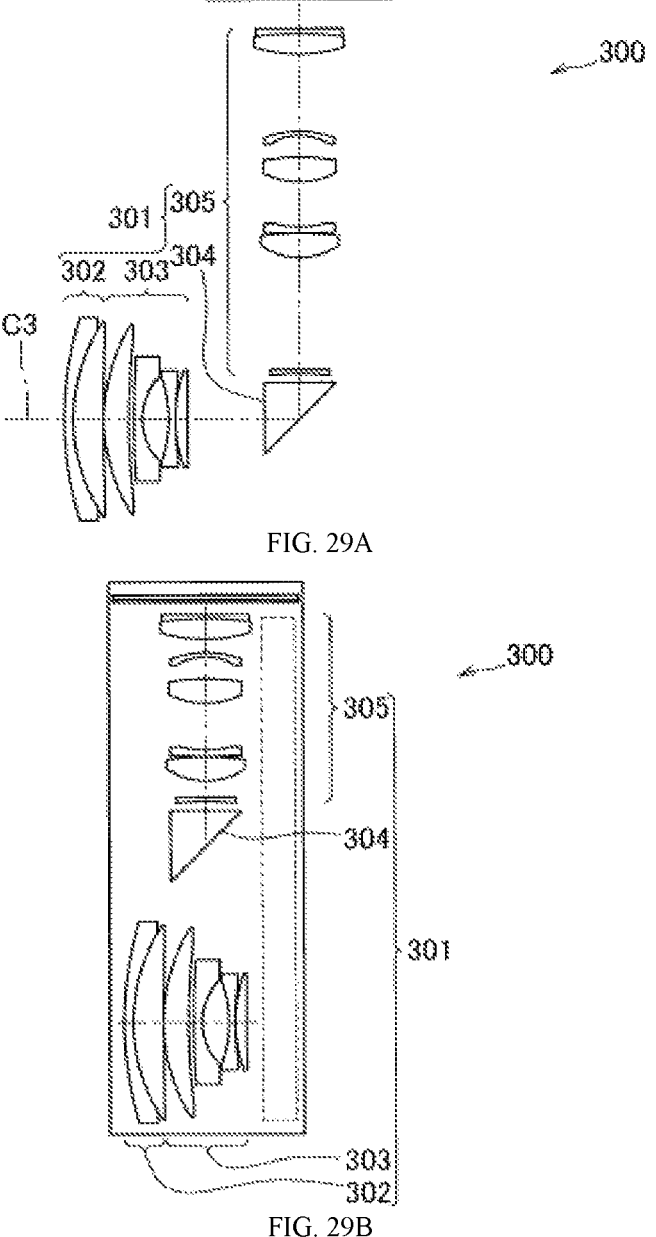

FIG. 29A is a schematic view showing a configuration of a camera device, and is a view showing an imaging state.

FIG. 29B is a schematic view showing a configuration of a camera device, and is a view showing a state in which a zoom lens is stored.

DETAILED DESCRIPTION

Due to the difficulty of thinning and miniaturizing the zoom lens, the camera device of the mobile apparatus is rarely equipped with the zoom lens. Therefore, in the existing mobile apparatus, in order to form a discrete zoom lens, a plurality of single focus camera devices with a plurality of different field angles are arranged side by side, for imaging.

However, as the number of camera devices increases, the numbers of sensors, circuits, etc. also increase, so that not only the cost increases, but also the volume increases with the number of camera devices. Therefore, there is a problem that the mobile apparatus such as the smart phone becomes larger and heavier as a whole.

Therefore, a following camera device is developed. The camera device has a telescopic zoom lens. When the zoom lens changes from an imaging state to a telescopic state, a size during retraction is reduced by relatively moving a part of optical elements in a same plane orthogonal to an optical axis (refer to Japanese Patent Publication No. 4520190).

As illustrated in FIGS. 27A to 27C, a camera device 100 has a zoom optical system 101 and an imaging element Se. The zoom optical system 101 has three lens groups (a first lens group 102, a second lens group 103, and a third lens group 104) and a low-pass filter 105 arranged in a direction of an optical axis C1. Moreover, in the zoom optical system 101, during retraction, the second lens group 103 slides laterally from the optical axis C1 (refer to FIG. 27B), and the first lens group 102 retreats to a position where the second lens group 103 is previously located before it slides (refer to FIG. 27C). An overall size of the zoom optical system 101 in this state (during retraction) in a thickness direction is a size composed of the first lens group 102 and the third lens group 104. In addition, the size in the thickness direction is a size in a direction of connecting an object to be imaged with a lens of the zoom optical system 101 closest to an object side, and is a size in a left-right direction in FIGS. 27A to 27C.

In the zoom optical system 101, during retraction, as described above, since the second lens group 103 slides laterally from the optical axis C1, and the first lens group 102 retreats to the position where the second lens group 103 is previously located before it slides, it is possible to realize a thin configuration by utilizing the number of the second lens groups 103, compared with a conventional telescopic zoom optical system. However, in the zoom optical system 101, a size of a thickness composed of two lens groups (the first lens group 102 and the third lens group 104) is also required during retraction, so it cannot be said that it can be thinned sufficiently.

In addition, as illustrated in FIG. 28, a following camera device 200 is developed. The camera device 200 has a zoom optical system 201 realizing a thin configuration by bending an optical axis C2 using reflective prisms (reflective optical elements) 202A and 205A (refer to Japanese Patent Publication No. 5551055).

The zoom optical system 201 of the camera device 200 sequentially has a first lens group 202, a second lens group 203, a third lens group 204 and a fourth lens group 205 from an object side to an image side along the optical axis C2. The first lens group 202 and the fourth lens group 205 have a reflective prism 202A and a reflective prism 205A respectively, thereby realizing the thin configuration. In the zoom optical system 201, the thin configuration is realized by bending the optical axis C2 using the reflective prism 202A and the reflective prism 205A, but a distance between the reflective prism 202A and the reflective prism 205A (a space in which the second lens group 203 and the third lens group 204 are arranged) will not be reduced in a non-imaging state. Therefore, it cannot be said that miniaturization can be sufficiently achieved in a direction orthogonal to a thickness direction (a direction from the reflective prism 202A of the first lens group 202 to the reflective prism 205A of the fourth lens group 205: a left-right direction in FIG. 28).

In addition, as illustrated in FIG. 29A and FIG. 29B, a camera device 300 is developed. The camera device 300 has a zoom optical system 301. The zoom optical system 301 sequentially has: a first lens group 302 having a positive curvature; a second lens group 303 having a negative curvature; a reflective prism (a reflective optical element) 304 bending an optical axis C3; and a subsequent lens group 305 including a plurality of lens groups (refer to Japanese Patent Publication No. 4790052) from an object side to an image side along the optical axis C3. In the zoom optical system 301, during zoom, at least the first lens group 302 and the second lens group 303 move; and during retraction, the reflective prism 304 moves to a position different from that when imaging, and the first lens group 302 and the second lens group 303 are retracted into a space generated by this movement.

In the zoom optical system 301, the first lens group 302 and the second lens group 303 are accommodated in the space vacated by the movement of the reflective prism 304 during retraction, thus realizing a thin configuration in the non-imaging state. However, since the first lens group 302 and the second lens group 303 are retracted (refer to FIG. 29B), a size in a thickness direction (a size in a left-right direction in FIG. 29B) is a size composed of at least the two lens groups 302 and 303, and sufficient thinning cannot be achieved. Moreover, in the zoom optical system 301, since the first lens group 302 has a positive refractive index, it is difficult to realize a wide-angle.

An implementation of the present disclosure will be described below with reference to accompanying drawings.

Figure 1:
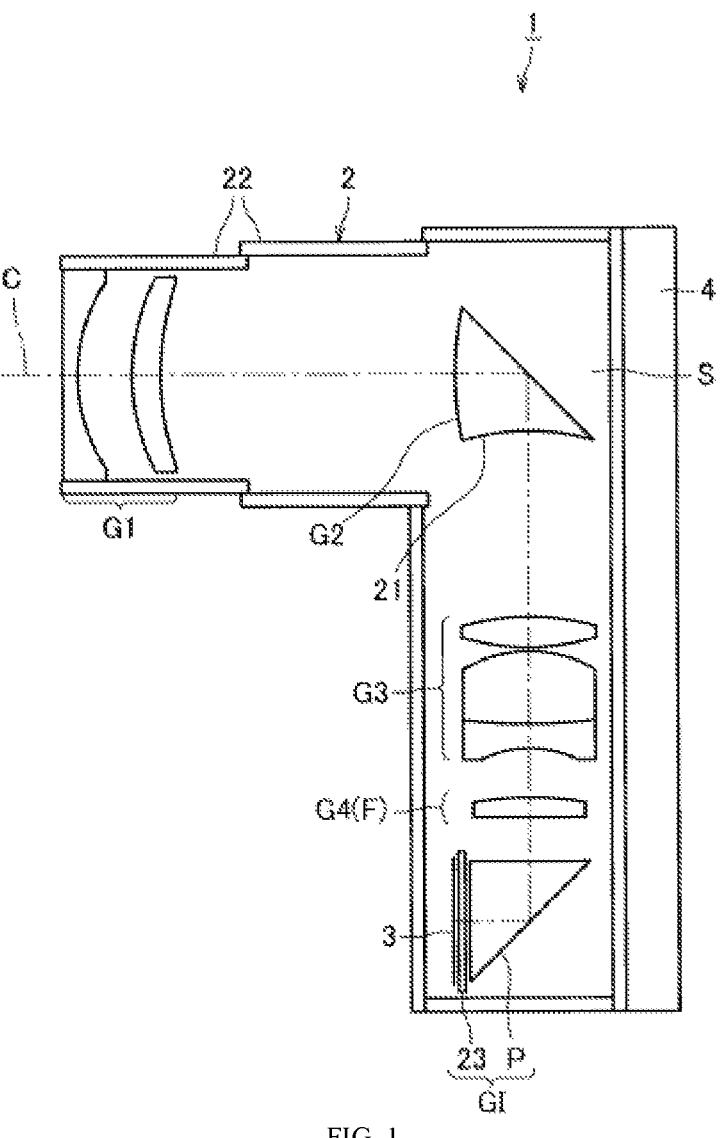
FIG. 1 is a schematic view showing a configuration of a camera device according to a present implementation, and is a view showing an imaging state.
Figure 2:
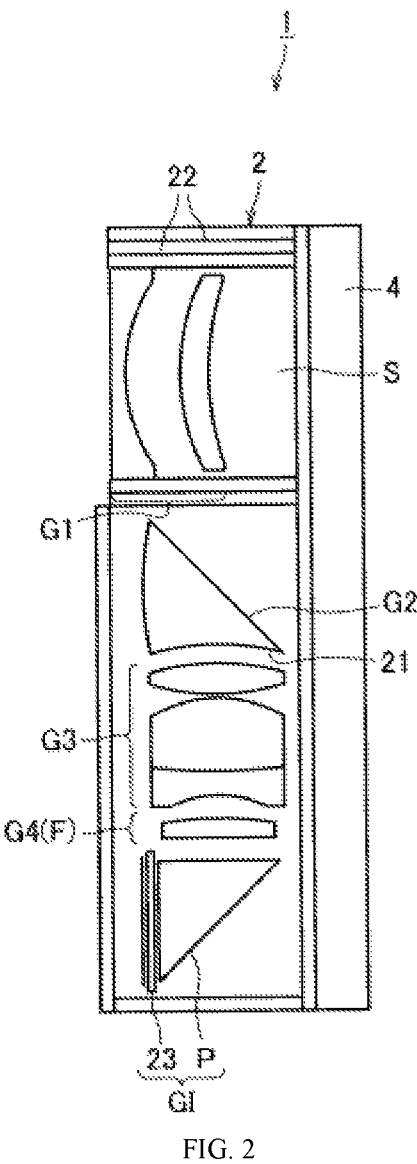
FIG. 2 is a schematic view showing a configuration of a camera device, and is a view showing a state in which a zoom lens is stored.

As illustrated in FIGS. 1 and 2, a camera device of the present implementation has a bent telescopic zoom lens (a zoom optical system) 2. In the zoom lens 2, a first lens group G1 has a negative refractive power to adapt to a wide-angle, and only the first lens group G1 is a telescopic portion. In addition, in order to promote a thin configuration, a reflective optical element (I-lens group GI) is also provided on an image side, so that a thickness size of the camera device 1 (a size in a left-right direction in FIGS. 1 and 2) is not affected by a shape of an imaging element 3. In addition, since the reflective optical element (second lens group G2) slides during retraction, only a maximum effective diameter of lenses (optical elements) constituting respective lens groups closer to the image side than the first lens group G1, or a size of the first lens group G1 in a thickness direction corresponds to the thickness of the camera device 1. As described above, this structure can be utilized to realize both the wide-angle and the thin configuration. In addition, a size in the thickness direction in the present implementation is a size in a direction connecting an object to be imaged with a lens of the zoom lens 2 closest to an object side, and is the size in the left-right direction in FIGS. 1 and 2.

Specifically, the camera device 1 has a zoom lens 2 which may be retracted; an imaging element 3 arranged at an image plane position of the zoom lens 2; and a liquid crystal display 4 configure to display imaging (image) data transmitted from the imaging element 3. The imaging element 3 is an element that converts an optical image formed by the zoom lens 2 into an electrical signal (imaging data), and the imaging element 3 of the present implementation is an image sensor.

A zoom lens 2 sequentially has at least a first lens group G1, a second lens group G2, a third lens group (the P-lens group) G3, and an I-lens group GI from an object side to an image side along an optical axis C. The zoom lens 2 of the present implementation sequentially has a first lens group G1, a second lens group G2, a third lens group G3, a fourth lens group G4, and an I-lens group GI from an object side to an image side along an optical axis C. In the zoom lens 2, the fourth lens group G4 constitutes a focus lens group F.

In addition, the zoom lens 2 may be a structure without the I-lens group GI. In addition, in the zoom lens 2 of the present implementation, the lens groups G1 to GI are named for convenience, and may further include a lens group composed of only one optical element (a lens, etc.). In addition, in the zoom lens 2, optical elements (lenses, etc.) whose positions are fixed on the optical axis C and optical elements moving in different tracks when zooming are divided respectively, the fixed at least one optical element in a divided area is regarded as one lens group, and the moving at least one optical element in a divided area is regarded as another lens group.

In addition, the zoom lens 2 has an aperture diaphragm 21 and a lens barrel 22, the aperture diaphragm 21 is arranged on the image side of the second lens group G2, and the lens barrel 22 holds the first lens group G1. The lens barrel 22 extends to the object side when imaging (refer to FIG. 1), and is retracted when imaging is not performed (refer to FIG. 2).

In the zoom lens 2, during imaging, at least the first lens group G1 of the first lens group G1 and the second lens group G2 moves along the optical axis C to reduce a spacing with the second lens group G2, and the third lens group G3 moves to reduce a spacing with the second lens group G2 when zooming from a wide-angle state to a telephoto state. In addition, positions of the second lens group G2 and the I-lens group GI with respect to the imaging element 3 (an image plane of the zoom lens 2) on the optical axis C are fixed.

In addition, in the zoom lens 2, during retraction, for embodiment, in a non-imaging state, the second lens group G2 moves along the optical axis C to the image side, and at least a part of the first lens group G1 is retracted by a space generated by the movement of the second lens group G2. That is, at least a part of the first lens group G1 is retracted into a space S during retraction, and the second lens group G2 is arranged in the space S during imaging. Here, the movement of respective lens groups G1 to G4 and the expansion and retraction of the lens barrel 22 are performed by various mechanisms.

Hereinafter, the respective lens groups G1 to GI of the zoom lens 2 will be described in detail.

The first lens group G1 includes a plurality of lenses (optical elements) and has a negative refractive power. The second lens group G2 has a reflective optical element bending the optical axis C. The reflective optical element of the present implementation is a prism, but may also be an optical element such as a mirror capable of bending an optical path (the optical axis C). The second lens group G2 of the present implementation is composed of only the reflective optical element. The third lens group G3 includes a plurality of lenses (optical elements) and has a positive refractive power. The I-lens group GI has a reflective optical element P and an optical filter 23, the reflective optical element P is arranged on the object side of the imaging element 3 (the image plane of the zoom lens 2) and bends the optical axis C, and the optical filter 23 is arranged on the image side of the reflective optical element P. The reflective optical element P of the present implementation is a prism, but may also be an optical element such as a mirror capable of bending an optical path (the optical axis C).

In the zoom lens 2, when a focal length of the first lens group G1 is set to f1 and a focal length of the wide-angle state is set to fw, the following is satisfied:

$$-6.000 \leq f1/fw \leq -1.500 \tag{1}.$$

By setting a ratio of the focal length of the first lens group G1 to the focal length of the wide-angle state to a range shown in the above formula (1), the optimization for the balance between the high-performance and the wide-angle of the field angle at the wide-angle state can be achieved. The details are as follows.

When the ratio is lower than the lower limit value (−6.000) of formula (1), a focal power of the first lens group G1 becomes weak, so that it is impossible to realize a focal power configuration of retrofocus type, and hence it is difficult to realize the wide-angle of the field angle at the wide-angle state. On the other hand, when the ratio exceeds the upper limit value (−1.500) of formula (1), the focal power of the first lens group G1 becomes stronger, so that it is easier to realize the wide-angle. However, in a whole region of a zoom region, it is difficult to correct the magnification chromatic aberration, coma aberration and image plane bending through the respective lens groups G1 to GI, so that the correction of each aberration is insufficient and the high performance cannot be achieved. Thus, in the zoom lens 2, if the focal power of the first lens group G1 is enhanced, the field angle at the wide-angle state may reach the wide-angle, but on the other hand, the aberration correction becomes difficult. In this state, the above formula (1) shows an optimal condition for the focal length f1 of the first lens group G1.

Furthermore, in the zoom lens 2 of the present implementation, the ratio preferably satisfies:

$$-5.500 \leq f1/fw \leq -1.700;$$

more preferably:

$$-5.000 \leq f1/fw \leq -2.000.$$

In addition, in the zoom lens 2, when a focal length of the third lens group (the P-lens group) G3 is set to fP, the focal length of the wide-angle state is set to fw, and a focal length of the telephoto state is set to ft, the following is satisfied:

$$0.500 \leq fP/\sqrt{(fw \times ft)} \leq 2.500 \tag{2}.$$

By setting a ratio of the focal length of the third lens group G3 to an effective focal length of the whole optical system (the zoom lens) 2 as a range shown in the above formula (2), optimization for the balance between the high performance and miniaturization of the whole optical system can be achieved. The details are as follows.

When the ratio is lower than the lower limit value (0.500) of formula (2), a focal power of the third lens group G3 becomes stronger, so that it is difficult to correct the spherical aberration, etc., and the high performance cannot be achieved. On the other hand, when the ratio exceeds the upper limit value (2.500) of formula (2), the focal power of the third lens group G3 becomes weaker, so that an optical full length becomes longer, and it is difficult to miniaturize the whole optical system (the zoom lens) 2. Thus, since the third lens group G3 is a lens group having a positive refractive power, the optical full length may be reduced if the focal power is enhanced, but on the other hand, the aberration correction becomes difficult. In this state, the above formula (2) shows an optimal condition for the focal length of the third lens group G3.

Furthermore, in the zoom lens 2 of the present implementation, the ratio preferably satisfies:

$$0.650 \leq fP/\sqrt{(fw \times ft)} \leq 2.000;$$

more preferably:

$$0.800 \leq fP/\sqrt{(fw \times ft)} \leq 1.500.$$

In addition, in the zoom lens 2, when a shift amount (a shift towards the image side being defined as positive) of the first lens group G1 from the wide-angle state to the telephoto state is set to m1, the focal length of the wide-angle state is set to fw, and the focal length of the telephoto state is set to ft, the following is satisfied:

$$0.800 \leq m1/\sqrt{(fw \times ft)} \leq 2.500 \tag{3}.$$

By setting a ratio of the shift amount of the first lens group G1 to the effective focal length of the whole optical system (the zoom lens) 2 to a range shown in the above formula (3), it is possible to achieve optimization of balance between ensuring a zoom ratio and the thin configuration presented when retracted under the ensured zoom ratio. The details are as follows.

When the ratio is lower than the lower limit value (0.800) of formula (3), the shift amount of the first lens group G1 becomes smaller, so that it is difficult to ensure a sufficient zoom ratio. On the other hand, when the ratio exceeds the upper limit value (2.500) of formula (3), the shift amount of the first lens group G1 becomes larger, so that it is difficult to thin mechanical parts such as a cam barrel constituting the telescopic lens, and it is difficult to thin a thickness presented when retracted. Thus, the shift amount of the first lens group G1 that helps to zoom is increased by moving, so that the zoom ratio can be ensured. However, on the other hand, it is difficult to thin the mechanical parts constituting the telescopic lens, and thus it is difficult to thin the thickness presented when retracted. In this state, the above formula (3) shows an optimal condition for the shift amount of the first lens group G1.

Furthermore, in the zoom lens 2 of the present implementation, the ratio preferably satisfies:

$$0.900 \leq m1/\sqrt{(fw \times ft)} \leq 2.000;$$

more preferably:

$$1.000 \leq m1/\sqrt{(fw \times 1.800}.$$

In addition, in the zoom lens 2, when the focal length of the first lens group G1 is set to f1 and the focal length of the third lens group (the P-lens group) G3 is set to fP, the following is satisfied:

$$-5.000 \leq f1/fP \leq -0.500 \tag{4}$$

By setting a ratio of the focal length of the first lens group G1 to the focal length of the third lens group G3 to a range shown in the above formula (4), optimization for the balance between the wide-angle of the field angle at the wide-angle state and the miniaturization of the whole optical system can be achieved. The details are as follows.

When the ratio is lower than the lower limit value (−5.000) of formula (4), the focal power of the first lens group G1 becomes weak, so that it is impossible to obtain focal power configuration of retrofocus type, so that it is difficult to realize the wide-angle of the field angle at the wide-angle state. On the other hand, when the ratio exceeds the upper limit value (−0.500) of formula (4), the focal power of the third lens group G3 becomes weaker, so that the optical full length becomes longer, and it is difficult to miniaturize the whole optical system (the zoom lens) 2. Thus, in the ratio of the focal power of the first lens group G1 to the focal power of the third lens group G3, if the focal power of the first lens group G1 is reduced, the optical full length can be reduced, but on the other hand, it becomes difficult to realize the wide-angle. In this state, the above formula (4) shows an optimal condition for the ratio of the focal length of the first lens group G1 and the focal length of the third lens group G3.

Furthermore, in the zoom lens 2 of the present implementation, the ratio preferably satisfies:

$$-4.000 \leq f1/fP \leq -0.700;$$

more preferably:

$$-3.000 \leq f1/fP \leq -0.900.$$

In addition, in the zoom lens 2, when the focal length of the telephoto state is set to ft, the focal length of the wide-angle state is set to fw, a lateral magnification of the third lens group (the P-lens group) G3 in infinity focus at the telephoto state is set to bPt, and a lateral magnification of the third lens group (the P-lens group) G3 in infinity focus at the wide-angle state is set to bPw, the following is satisfied:

$$0.200 \leq |(ft/fw)/(bPt/bPw)| \leq 4.000 \tag{5}.$$

By setting a zoom ratio of a magnification change of the whole optical system (the zoom lens) 2 and a magnification change of the third lens group G3 to a range shown in the above formula (5), the degradation of the design performance after assembled caused by the simplification and miniaturization of the zoom mechanism and the relative eccentricity of the respective lens groups G1 to GI can be reduced. The details are as follows.

When the ratio is lower than the lower limit value (0.200) of formula (5), lens groups other than the third lens group G3 need to be designed to reduce magnification when zooming from the wide-angle state to the telephoto state, so that it is difficult to reduce and miniaturize lens groups and the number of lenses. On the other hand, when the ratio exceeds the upper limit value (4.000) of formula (5), lens groups other than the third lens group G3 need to be designed to increase magnification. Therefore, many lens groups need to be moved during zoom, and the shift amount is also large, so that it is difficult to realize the miniaturization. Therefore, the zoom ratio is optimized by effectively using the magnification change along with the movement of the third lens group G3, so that a lens group remaining fixed relative to the image plane during zoom is arranged. Therefore, compared with the lens with many lens groups moving during zoom, the degradation of the design performance after assembly caused by the simplification and miniaturization of the zoom mechanism and the relative eccentricity of respective lens groups can be reduced. In this state, the above formula (5) shows an optimal condition for the magnification change of the P-lens group.

Furthermore, in the zoom lens 2 of the present implementation, the ratio preferably satisfies:

$$0.300 \leq |(ft/fw)/(bPt/bPw)| \leq 3.000;$$

more preferably:

$$0.400 \leq |(ft/fw)/(bPt/bPw)| \leq 2.000.$$

In addition, in the zoom lens 2, when the focal length of the wide-angle state is set to fw, the focal length of the telephoto state is set to ft, and a focal length of the second lens group G2 is set to f2, the following is satisfied:

$$-1.000 \leq \sqrt{(fw \times ft)}/f2 \leq 2.000 \qquad (6).$$

By setting the ratio of the effective focal length of the whole lens system to the focal length of the second lens group to a range shown in the above formula (6), the optimization for the balance between the high performance and the wide-angle of the field angle at the wide-angle state can be achieved. The details are as follows.

When the ratio is lower than the lower limit value (−1.000) of formula (6), since the second lens group G2 has a strong negative focal power, a lens group with a strong positive focal power needs to be arranged closer to the image side than the second lens group G2, so that it is difficult to correct the spherical aberration, etc., and the high performance cannot be achieved. On the other hand, when the ratio exceeds the upper limit value (2.000) of formula (6), since the second lens group G2 has a strong positive focal power, it is impossible to obtain the focal power configuration of retrofocus type, so that it is difficult to realize the wide-angle of the field angle at the wide-angle state. In this state, the above formula (6) shows the optimal condition for the focal length of the second lens group G2.

In addition, when the second lens group G2 is at a focal power without optical divergence or convergence, in the above formula (6), f2 is set to ∞, and the calculation result (the ratio) is 0.

Furthermore, in the zoom lens 2 of the present implementation, the ratio preferably satisfies:

$$-0.500 \leq \sqrt{(fw \times ft)}/f2 \leq 1.750;$$

more preferably:

$$-0.200 \leq \sqrt{(fw \times ft)}/f2 \leq 1.500.$$

According to the zoom lens 2 configured as above, the first lens group G1 has a negative refractive power, and the second lens group G2 has a reflective optical element bending the optical axis C. Moreover, during retraction, the second lens group G2 moves along the optical axis C to the image side, and the first lens group G1 is retracted in the space S generated by the movement of the second lens group G2. Thus, since the first lens group G1 with the negative refractive power is arranged on the side closest to the object, it is easy to obtain the focal power configuration of retrofocus type, and the wide-angle can be achieved by shortening a focal length at the wide-angle state.

Moreover, the second lens group G2 (the reflective optical element) bends the optical path (the optical axis C) of the light incident from the object side. In addition, the second lens group G2 moves along the optical axis C to the image side during retraction, and the first lens group G1 moves in the space S generated by the movement (i.e., a position of the second lens group G2 in an imaging state). Thus, the thin configuration (miniaturization of the size in the thickness direction) of the whole zoom lens 2 can be realized.

That is, in the zoom lens 2, on the basis of seeking the thin configuration of the zoom lens 2 (the miniaturization of the size in the thickness direction) through bending the optical path by the second lens group G2, the zoom lens 2 can be further thinned (the miniaturization of the size in the thickness direction) during non-imaging (retraction) by retracting the first lens group G1. In addition, during retraction, the second lens group G2 moves along a second optical axis (i.e. an optical axis after bending) to the image side, and the first lens group G1 moves along a first optical axis (an optical axis before bending) to be retracted into the space S. Therefore, the second lens group G2 and the first lens group G1 may move independently in two different directions, thus ensuring their freedom of movement and moving space.

In addition, during retraction, since the second lens group G2 moves along the optical axis C to the image side, i.e., to reduce spacing between the respective lens groups required by the zoom lens 2, a volume can be minimized, thus realizing the miniaturization of the whole zoom lens 2 (specifically, the miniaturization of a size in an up-down direction in FIGS. 1 and 2).

In addition, in the zoom lens 2 of the present implementation, the third lens group (the P-lens group) G3 has a positive refractive power. In addition, when zooming from the wide-angle state to the telephoto state of the zoom lens 2, at least the first lens group G1 of the first lens group G1 and the second lens group G2 moves along the optical axis C to reduce a spacing with the second lens group G2, the third lens group (the P-lens group) G3 moves to reduce a spacing with the second lens group G2, and positions of the second lens group G2 and the I-lens group GI relative to the imaging element 3 (the image plane of the zoom lens 2) on the optical axis C are fixed. Thus, the third lens group G3 with a positive refractive power is arranged closer to the image side than the second lens group G2 whose position relative to the imaging element 3 (the image plane) is fixed on the optical axis C. By making the first lens group G1 and the third lens group G3 movable during zoom, magnifications of the respective lens groups may be changed, so that the zoom lens 2 can zoom effectively. That is, the high performance of the zoom lens 2 can be achieved.

In addition, in the zoom lens 2 of the present implementation, the I-lens group GI has a reflective optical element, and the reflective optical element is arranged on the object side of the imaging element 3 (the image plane of the zoom lens 2) and bends the optical axis C. Therefore, since the I-lens group GI (the reflective optical element) closer to an image plane side than the second lens group G2 bends the optical axis C extending from the second lens group G2, regardless of a size of the imaging element 3 arranged at a position of the image plane, a size of a portion in the thickness direction from the second lens group G2 to the I-lens group GI in the zoom lens 2 may be prevented from increasing. That is, sizes of the zoom lens 2 and the camera device 1 in the thickness direction do not affect the size of the imaging element 3.

As described above, the zoom lens 2 and the camera device 1 with the zoom lens 2 according to the present implementation can provide a zoom lens and a camera device with the zoom lens which can realize the wide-angle while achieving the thin configuration and miniaturization during retraction.

Next, embodiments 1 to 6 of the zoom lens of the present disclosure will be described. In the following various embodiments, the same reference numerals are used for the structures corresponding to the respective structures of the zoom lens 2 of the above implementation. In addition, in the tables in the following embodiments, r is a radius of curvature, d is a lens thickness or lens spacing, nd is a refractive index of a d-line, and vd represents the d-line dispersion coefficient of the reference. In addition, an aspheric surface is defined by formula 1 shown below.

$$z=ch^2/[1+[1-(1+k)c^2h^2]^{1/2}]+A4h^4+A^6h^6+A^8h^8+A^{10}h^{10} \quad \text{Formula 1}$$

(where c is a curvature (1/r), h is a height from the optical axis, k is a cone coefficient, and A4, A6, A8, A10 . . . are aspheric coefficients of each degree.)

In addition, each longitudinal aberration diagram sequentially shows a spherical aberration (SA (mm)), an astigmatism (AST (mm)), and a distorted aberration (DIS (%)) from the left side. In the spherical aberration diagram, a vertical axis represents an F number (represented by FNO in the figure), a solid line is the characteristic of the d-line, a short dash line is the characteristic of an F-Line, and a long dash line is the characteristic of a C-line. In an astigmatism diagram, a vertical axis represents the field angle (represented by W in the figure), a solid line is the characteristic of a sagittal plane (represented by S in the figure), and a dash line is the characteristic of a meridional plane (represented by M in the figure). In a distortion aberration diagram, a vertical axis represents the field angle (represented by W in the figure).

Embodiment 1

Figure 3A:
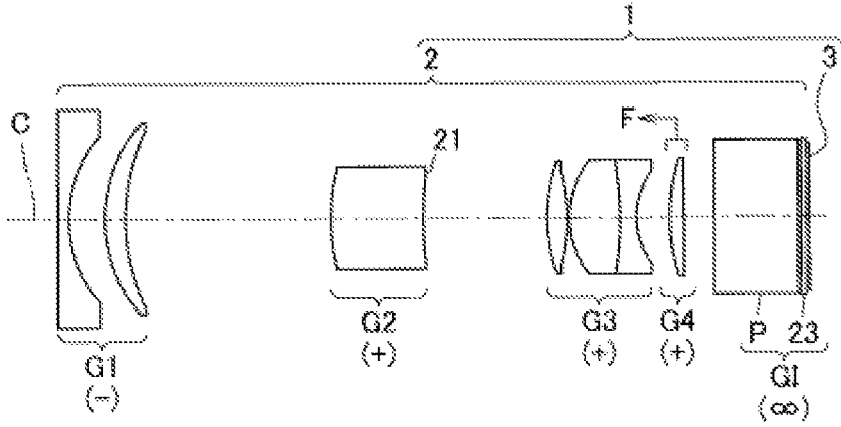
FIG. 3A is a lens structure diagram of a zoom lens according to embodiment 1 in a wide-angle state.
Figure 3B:
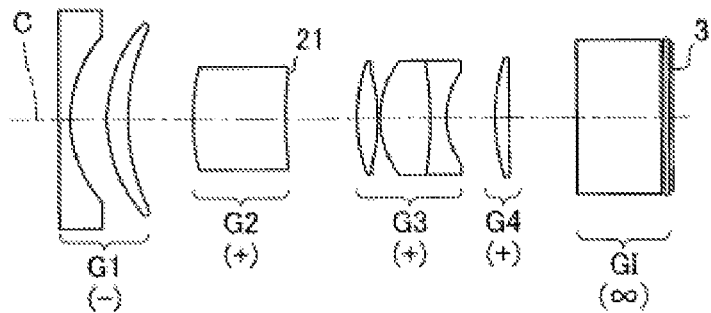
FIG. 3B is a lens structure diagram of a zoom lens according to embodiment 1 in an intermediate focus position state.
Figure 3C:
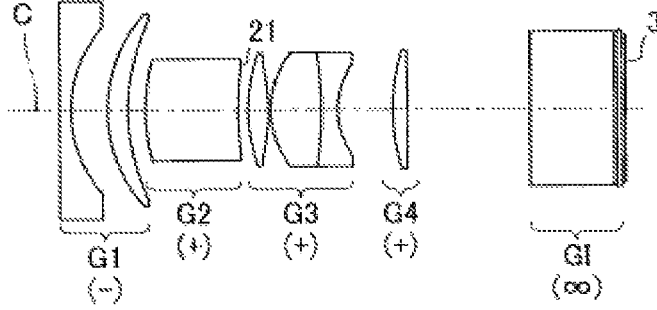
FIG. 3C is a lens structure diagram of a zoom lens according to embodiment 1 in a telephoto state.

FIGS. 3A to 3C are lens structure diagrams of the zoom lens of embodiment 1. FIG. 3A shows a wide-angle state, FIG. 3B shows an intermediate focus position state, and FIG. 3C shows a telephoto state. In addition, in FIGS. 3A to 3C, a state in which the optical axis is not bent is shown. In addition, reference numerals representing the respective structures of the zoom lens are the same as those of the corresponding structures of the zoom lens 2 of the above implementation.

In the zoom lens of embodiment 1, the third lens group is a P-lens group, and a group including a parallel plate glass (the optical filter) arranged on the image side is an I-lens group. In addition, in the zoom lens, positions of the second lens group and the I-lens group relative to the image plane on the optical axis are fixed during zoom.

Figure 4:
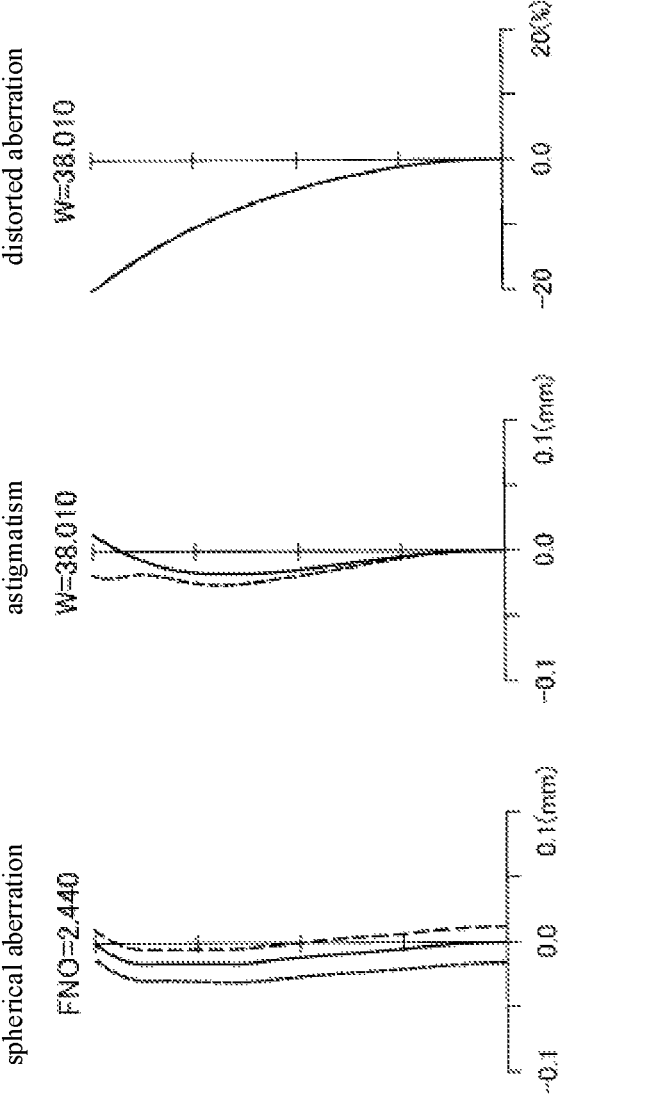
FIG. 4 is a longitudinal aberration diagram of a zoom lens according to embodiment 1 in a wide-angle state.
Figure 5:
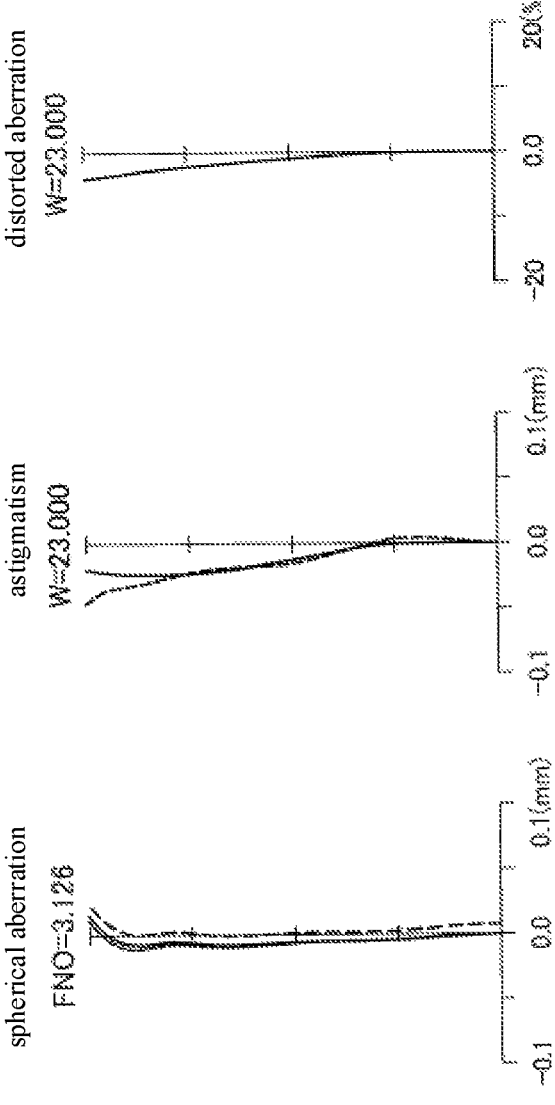
FIG. 5 is a longitudinal aberration diagram of a zoom lens according to embodiment 1 in an intermediate focus position state.
Figure 6:
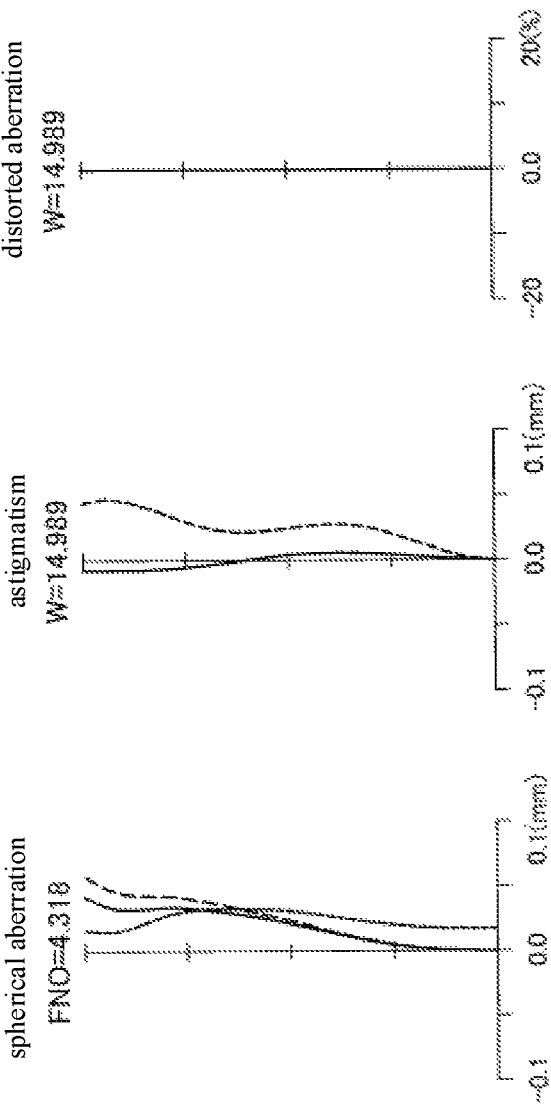
FIG. 6 is a longitudinal aberration diagram of a zoom lens according to embodiment 1 in a telephoto state.

In addition, FIG. 4 is a longitudinal aberration diagram in the wide-angle state, FIG. 5 is a longitudinal aberration diagram in the intermediate focus position state, and FIG. 6 is a longitudinal aberration diagram in the telephoto state. Table 1 below shows surface data of each lens, Table 2 shows aspheric data (an aspheric coefficient not shown is 0.00), Table 3 shows various data, Table 4 shows data of zoom lens groups, and Table 5 shows magnifications of zoom lens groups.

TABLE 1

| surface data | | | | |
|---|---|---|---|---|
| surface number | r | d | nd | vd |
| 1 | 113.148 | 0.700 | 1.8513 | 40.10 |
| 2* | 6.934 | 2.202 | | |
| 3 | 8.575 | 1.217 | 1.9229 | 20.88 |
| 4 | 12.258 | d4 | | |
| 5* | 13.501 | 5.500 | 1.5445 | 55.96 |
| 6* | 26.479 | d6 | | (aperture diaphragm) |
| 7* | 10.980 | 1.200 | 1.4971 | 81.56 |
| 8* | −10.947 | 0.200 | | |
| 9 | 5.400 | 3.000 | 1.5831 | 59.46 |
| 10 | −23.369 | 1.000 | 1.9537 | 32.32 |
| 11 | 4.551 | d11 | | |
| 12* | 17.489 | 0.825 | 1.5931 | 37.65 |
| 13* | −60.350 | d13 | | |
| 14 | ∞ | 5.000 | 2.0010 | 29.13 |
| 15 | ∞ | 0.200 | | |
| 16 | ∞ | 0.300 | 1.5168 | 64.20 |
| 17 | ∞ | 0.200 | | |

*indicates an aspheric surface

TABLE 2

| aspheric data (An aspheric coefficient not shown is 0.00.) | | | | | | | | |
|---|---|---|---|---|---|---|---|---|
| surface number | k | A4 | A6 | A8 | A10 | A12 | A14 | A16 |
| 1 | 5.0000E+00 | −3.5796E−04 | 1.7460E−05 | −6.1693E−07 | 1.2082E−08 | −9.6783E−11 | 0.0000E+00 | 0.0000E+00 |
| 2 | −8.9458E−02 | −4.0517E−04 | 1.4523E−05 | −4.4857E−07 | 2.6059E−10 | 2.5473E−10 | −3.9071E−12 | 0.0000E+00 |
| 5 | 1.9814E+00 | −1.4083E−04 | −2.8105E−06 | −2.8761E−08 | −2.7423E−08 | 2.3605E−09 | 0.0000E+00 | 0.0000E+00 |
| 6 | 1.0290E+00 | 1.4697E−04 | −1.9534E−05 | 6.8697E−06 | −1.0648E−06 | 6.3201E−08 | 0.0000E+00 | 0.0000E+00 |
| 7 | 1.0493E+00 | 1.1868E−04 | −5.1710E−05 | 1.8678E−05 | −2.3905E−06 | 1.4739E−07 | 0.0000E+00 | 0.0000E+00 |
| 8 | −2.1634E+00 | 2.3388E−04 | −1.8969E−05 | 5.9427E−06 | 3.3965E−07 | −1.5811E−07 | 1.5525E−08 | −2.0045E−10 |
| 12 | 1.9532E−01 | 1.3818E−03 | −3.0013E−04 | 1.1939E−04 | −2.9104E−05 | 4.0937E−06 | −3.0438E−07 | 9.1287E−09 |
| 13 | −3.2850E+00 | 1.5712E−03 | −4.0514E−04 | 1.5762E−04 | −3.6464E−05 | 4.8364E−06 | −3.3947E−07 | 9.6540E−09 |

TABLE 3

| various data | | | |
|---|---|---|---|
| | wide-angle | intermediate | telephoto |
| focal length | 5.668 | 9.683 | 15.086 |
| F number | 2.440 | 3.126 | 4.318 |
| half field angle | 38.010 | 23.000 | 14.989 |
| overall length of lens | 45.000 | 36.651 | 33.789 |
| back focal length | 4.903 | 7.114 | 10.452 |
| d4 | 12.250 | 3.900 | 1.038 |
| d6 | 7.393 | 4.203 | 0.500 |
| d11 | 1.996 | 2.976 | 3.342 |
| d13 | 1.818 | 4.028 | 7.365 |

A zoom ratio is 2.662 and an image height is 4.048.

TABLE 4

| data of zoom lens groups | | | | |
| --- | --- | --- | --- | --- |
| group | starting surface | focal length | lens composition length | shift amount of lens |
| 1 | 1 | −13.575 | 4.119 | 11.209 |
| 2 | 5 | 43.812 | 5.500 | 0.000 |
| 3 | 7 | 12.643 | 5.400 | −6.896 |
| 4 | 12 | 23.604 | 0.825 | −5.549 |

TABLE 5

| magnifications of zoom lens groups | | | | |
| --- | --- | --- | --- | --- |
| group | starting surface | wide-angle | intermediate | telephoto |
| 1 | 1 | 0.000 | 0.000 | 0.000 |
| 2 | 5 | 2.439 | 1.665 | 1.502 |
| 3 | 7 | −0.2213 | −0.629 | −1.368 |
| 4 | 12 | 0.774 | 0.681 | 0.541 |

Embodiment 2

Figures 7A, 7B, 7C:
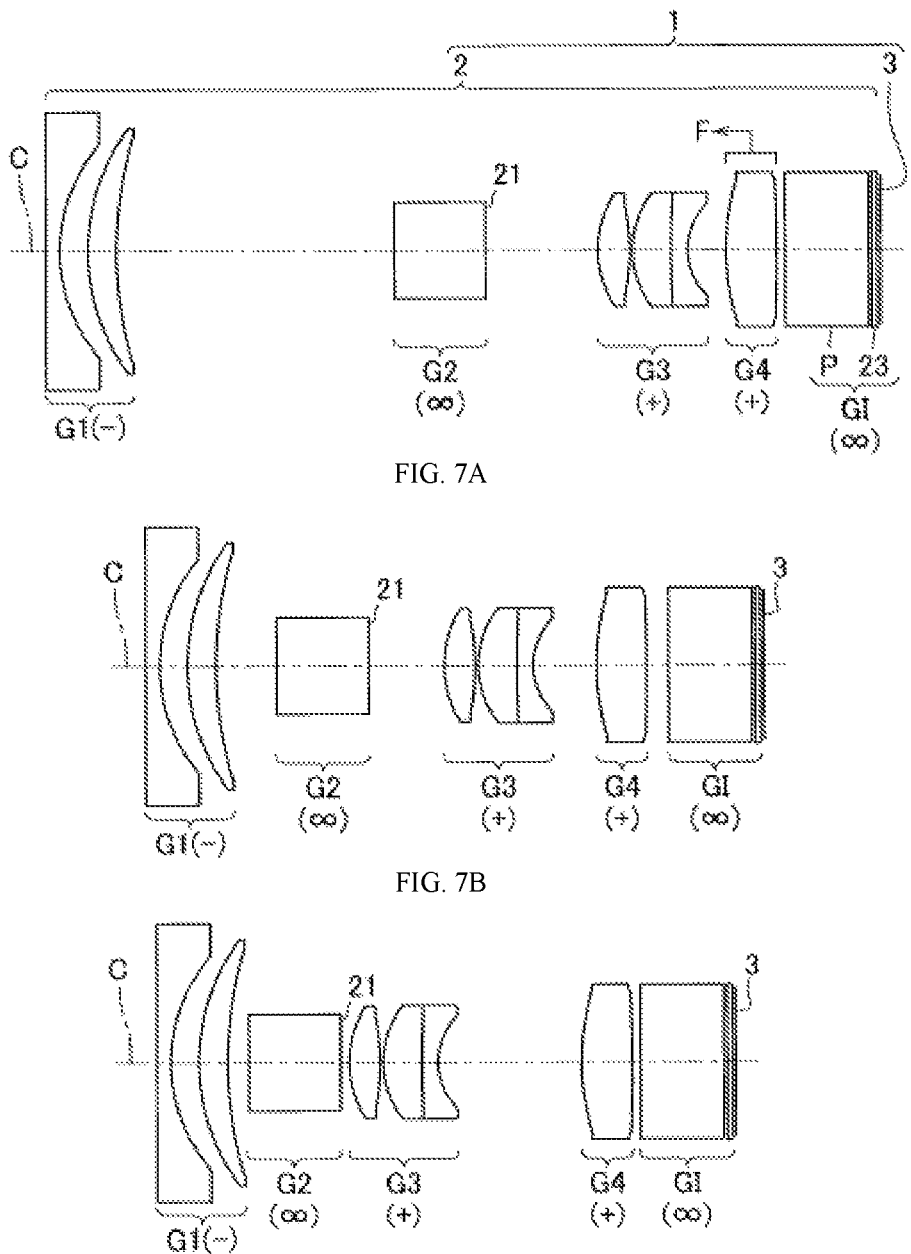
FIG. 7A is a lens structure diagram of a zoom lens according to embodiment 2 in a wide-angle state.
FIG. 7B is a lens structure diagram of a zoom lens according to embodiment 2 in an intermediate focus position state.
FIG. 7C is a lens structure diagram of a zoom lens according to embodiment 2 in a telephoto state.

FIGS. 7A to 7C are lens structure diagram of the zoom lens of embodiment 2. FIG. 7A shows a wide-angle state, FIG. 7b shows an intermediate focus position state, and FIG. 7C shows a telephoto state. In addition, in FIGS. 7A to 7C, a state in which the optical axis is not bent is shown. In addition, reference numerals representing the respective structures of the zoom lens are the same as those of the corresponding structures of the zoom lens 2 of the above implementation.

In the zoom lens of embodiment 2, the third lens group is a P-lens group, and a group including a parallel plate glass (the optical filter) arranged on the image side is an I-lens

TABLE 6

| surface number | r | d | nd | vd |
| --- | --- | --- | --- | --- |
| 1* | 84.713 | 0.700 | 1.8513 | 40.10 |
| 2* | 8.302 | 1.824 | | |
| 3 | 11.733 | 1.734 | 1.9229 | 20.88 |
| 4 | 24.082 | d4 | | |
| 5 | ∞ | 5.500 | 1.5445 | 55.96 |
| 6 | ∞ | d6 | | (aperture diaphragm) |
| 7* | 6.511 | 1.860 | 1.4971 | 81.56 |
| 8* | −13.589 | 0.200 | | |
| 9 | 5.499 | 2.312 | 1.5831 | 59.46 |
| 10 | 55.255 | 1.000 | 1.9537 | 32.32 |
| 11 | 3.807 | d11 | | |
| 12* | 15.360 | 3.000 | 1.5931 | 37.65 |
| 13* | −100.000 | d13 | | |
| 14 | ∞ | 5.000 | 2.0010 | 29.13 |
| 15 | ∞ | 0.200 | | |
| 16 | ∞ | 0.300 | 1.5168 | 64.20 |
| 17 | ∞ | 0.200 | | |

*indicates an aspheric surface

TABLE 7

| aspheric data (An aspheric coefficient not shown is 0.00.) | | | | | | | |
| --- | --- | --- | --- | --- | --- | --- | --- |
| surface number | A4 | A6 | A8 | A10 | A12 | A14 | |
| 1 | 4.8026E+00 | −4.1655E−04 | 1.5326E−05 | −3.1110E−07 | 3.1147E−09 | −1.2130E−11 | 0.0000E+00 | 0.0000E+00 |
| 2 | −2.3647E−01 | −4.8022E−04 | 1.6151E−05 | −2 5022E−07 | −3.8116E−10 | 2.9690E−11 | −6.0090E−14 | 0.0000E+00 |
| 7 | 4.2047E−02 | −1.8647E−04 | −8 9307E−06 | 7.1372E−06 | −8.6924E−07 | 5.7165E−08 | 0.0000E+00 | 0.0000E+00 |
| 8 | −4.3668E+00 | 3.3705E−04 | 1.4406E−05 | −1.3334E−07 | 9.1163E−07 | −1.7823E−07 | 1.6264E−08 | −4 1953E−10 |
| 12 | −4.3876E+00 | 6.1087E−04 | −3.3201E−08 | −7.1661E−07 | 4.4575E−07 | −5.6596E−08 | 3.3531E−09 | −7.6541E−11 |
| 13 | −5.0000E+00 | 9.6739E−04 | −1.1780E−04 | 1.2354E−05 | −1.0288E−06 | 3.3931E−08 | 4.6818E−10 | −3.7345E−11 | group. In addition, in the zoom lens, positions of the second lens group and the I-lens group relative to the image plane on the optical axis are fixed during zoom.

Figure 8:
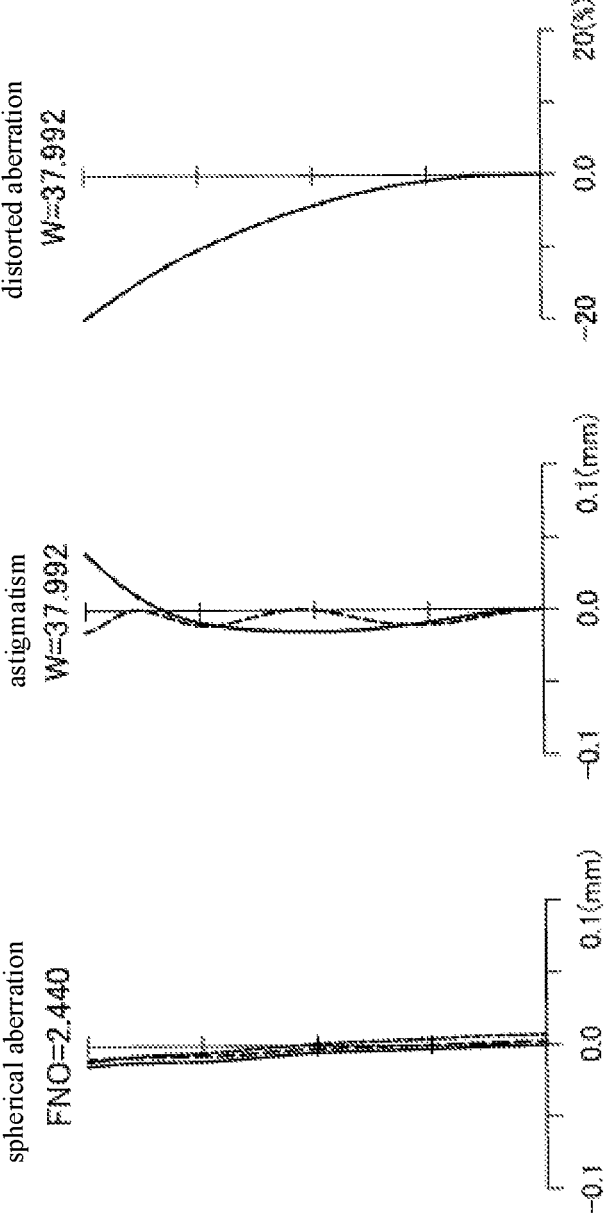
FIG. 8 is a longitudinal aberration diagram of a zoom lens according to embodiment 2 in a wide-angle state.
Figure 9:
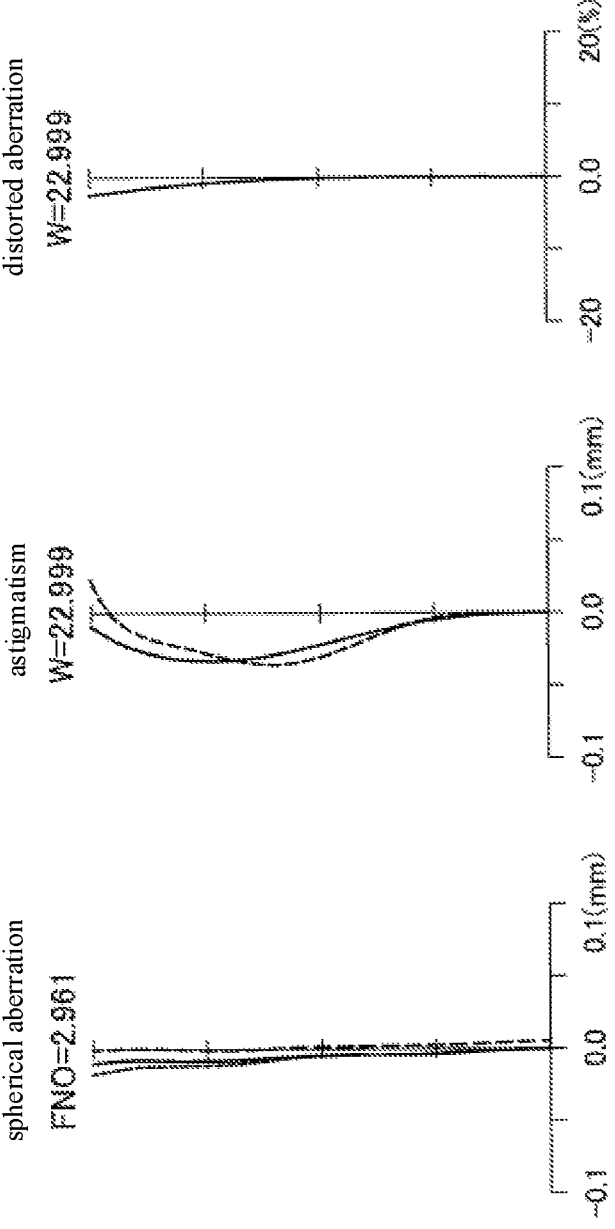
FIG. 9 is a longitudinal aberration diagram of a zoom lens according to embodiment 2 in an intermediate focus position state.
Figure 10:
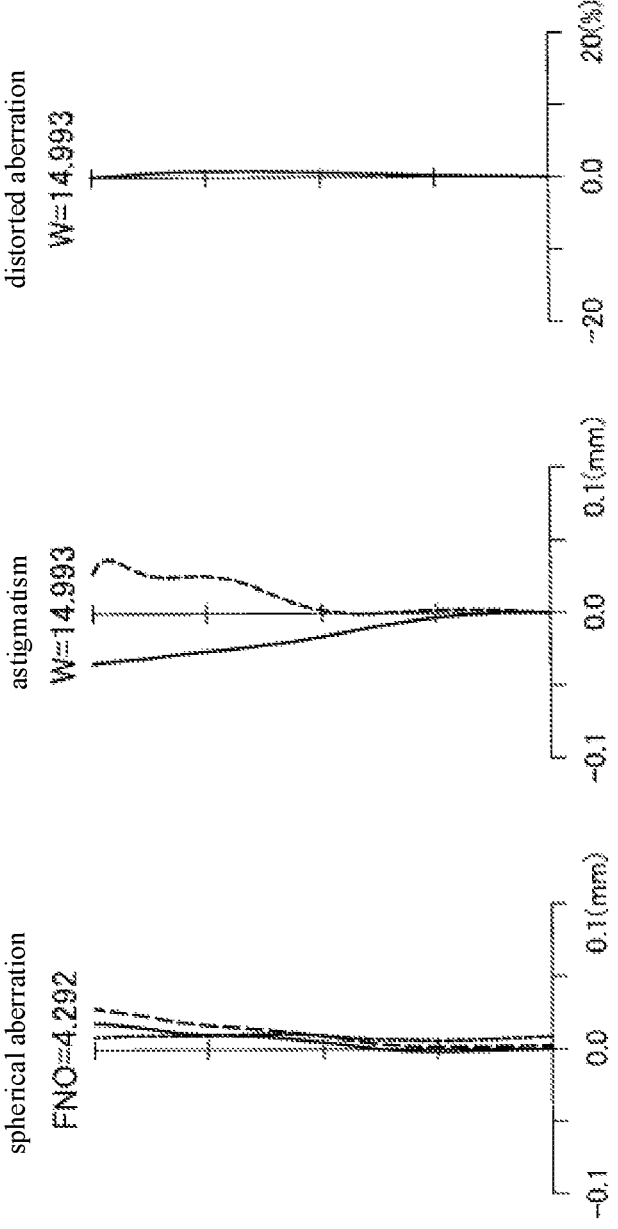
FIG. 10 is a longitudinal aberration diagram of a zoom lens according to embodiment 2 in a telephoto state.

In addition, FIG. 8 is a longitudinal aberration diagram in the wide-angle state, FIG. 9 is a longitudinal aberration diagram in the intermediate focus position state, and FIG. 10 is a longitudinal aberration diagram in the telephoto state. Table 6 below shows surface data of each lens, Table 7 shows aspheric data (an aspheric coefficient not shown is 0.00), Table 8 shows various data, Table 9 shows data of zoom lens groups, and Table 10 shows magnifications of zoom lens groups.

TABLE 8

| various data | | | |
| --- | --- | --- | --- |
| | wide-angle | intermediate | telephoto |
| focal length | 5.865 | 9.578 | 14.992 |
| F number | 2.440 | 2.961 | 4.292 |
| half field angle | 37.992 | 22.999 | 14.993 |
| overall length of lens | 50.000 | 36.985 | 34.537 |
| back focal length | 3.583 | 4.481 | 3.601 |
| d4 | 16.585 | 3.570 | 1.123 |
| d6 | 6.787 | 4.494 | 0.500 |

TABLE 8-continued

| various data | | | |
|---|---|---|---|
| | wide-angle | intermediate | telephoto |
| d11 | 2.302 | 3.690 | 8.570 |
| d13 | 0.496 | 1.395 | 0.515 |

A zoom ratio is 2.646 and an image height is 4.048.

TABLE 9

| data of zoom lens groups | | | | |
|---|---|---|---|---|
| group | starting surface | focal length | lens composition length | shift amount of lens |
| 1 | 1 | −22.161 | 4.257 | 15.463 |
| 2 | 5 | 0.000 | 5.500 | 0.000 |
| 3 | 7 | 11.538 | 5.372 | −6.287 |
| 4 | 12 | 23.310 | 3.000 | −0.019 |

TABLE 10

| magnifications of zoom lens groups | | | | |
|---|---|---|---|---|
| group | starting surface | wide-angle | intermediate | telephoto |
| 1 | 1 | 0.000 | 0.000 | 0.000 |
| 2 | 5 | 1.000 | 1.000 | 1.000 |
| 3 | 7 | −0.330 | −0.587 | −0.874 |
| 4 | 12 | 0.774 | 0.736 | 0.774 |

Embodiment 3

Figures 11A, 11B, 11C:
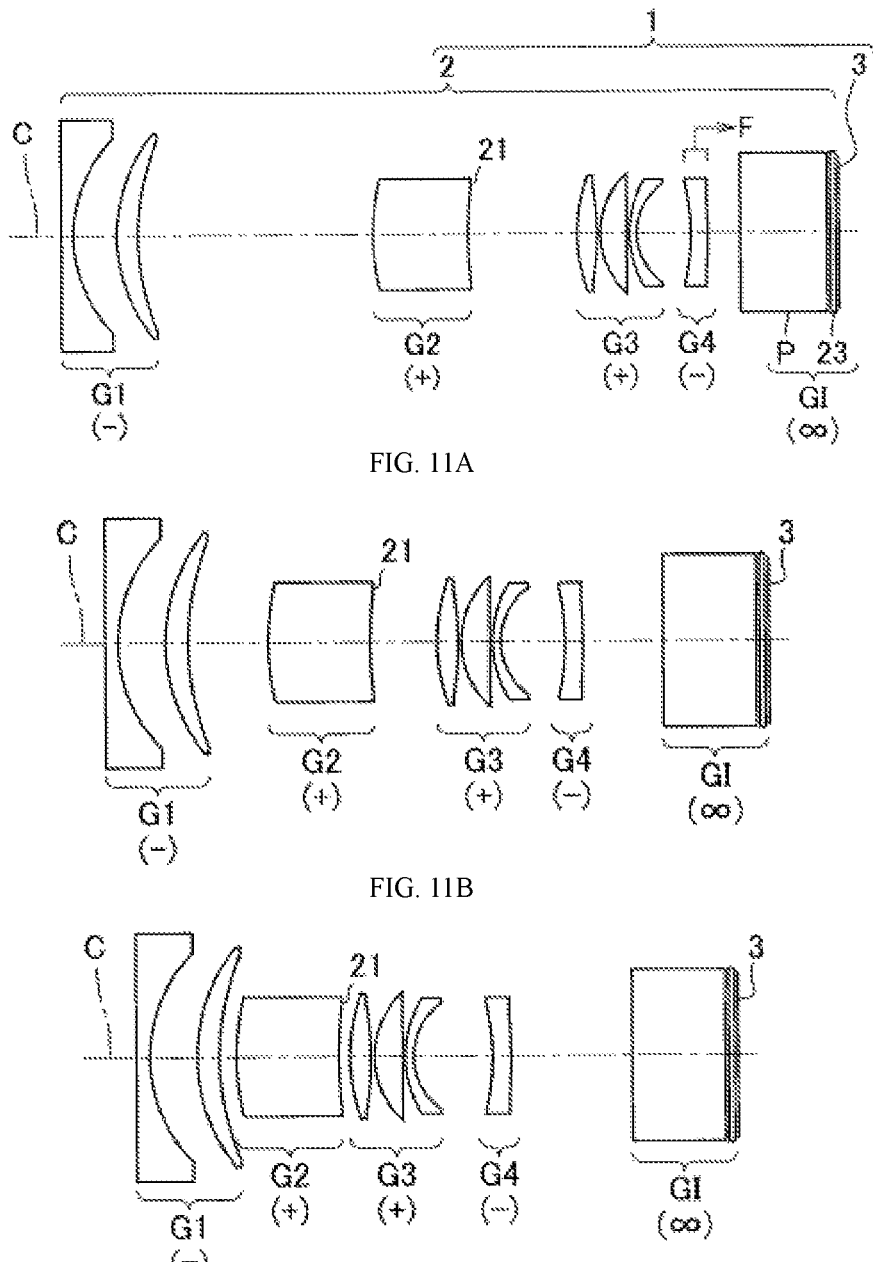
FIG. 11A is a lens structure diagram of a zoom lens according to embodiment 3 in a wide-angle state.
FIG. 11B is a lens structure diagram of a zoom lens according to embodiment 3 in an intermediate focus position state.
FIG. 11C is a lens structure diagram of a zoom lens according to embodiment 3 in a telephoto state.

FIGS. 11A to 11C are lens structure diagrams of the zoom lens of embodiment 3 FIG. 11A shows a wide-angle state, FIG. 11B shows an intermediate focus position state, and FIG. 11C shows a telephoto state. In addition, in FIGS. 11A to 11C, a state in which the optical axis is not bent is shown. In addition, reference numerals representing the respective structures of the zoom lens are the same as those of the corresponding structures of the zoom lens 2 of the above implementation.

In the zoom lens of embodiment 3, the third lens group is a P-lens group, and a group including a parallel plate glass (the optical filter) arranged on the image side is an I-lens group. In addition, in the zoom lens, positions of the second lens group and the I-lens group relative to the image plane on the optical axis are fixed during zoom.

Figure 12:
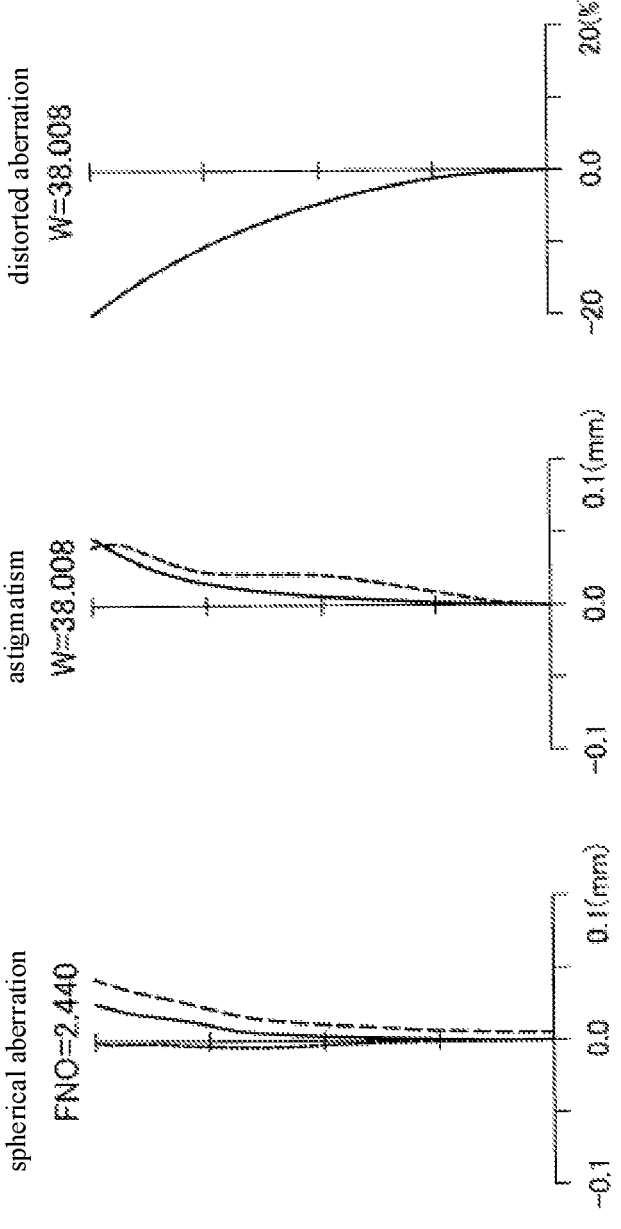
FIG. 12 is a longitudinal aberration diagram of a zoom lens according to embodiment 3 in a wide-angle state.
Figure 13:
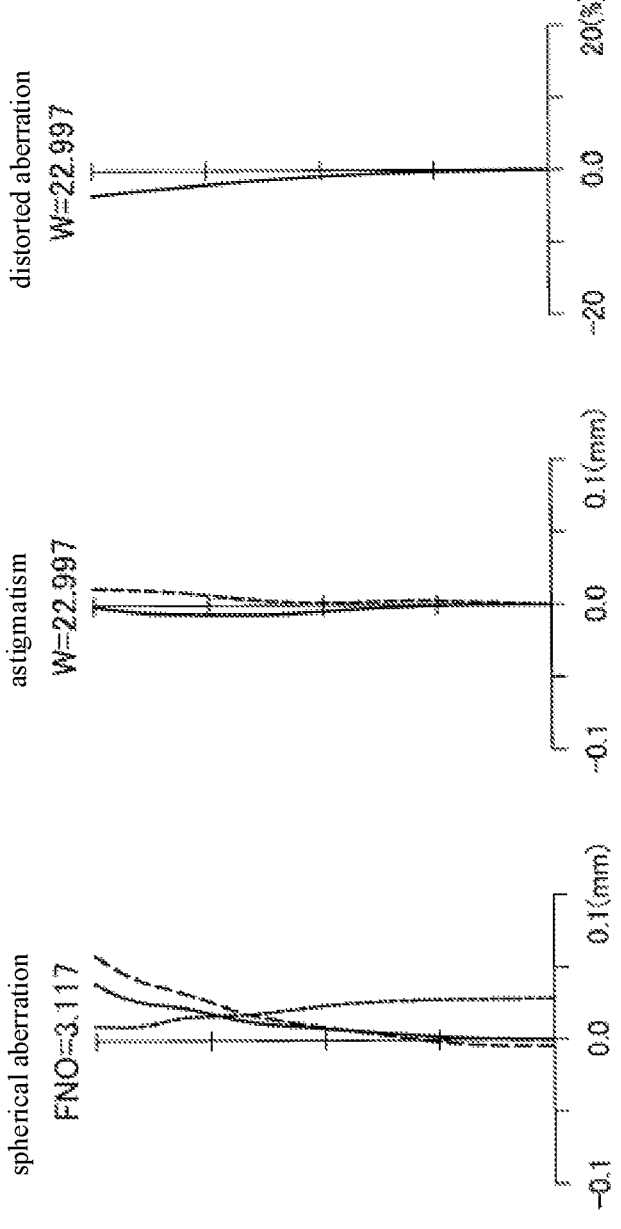
FIG. 13 is a longitudinal aberration diagram of a zoom lens according to embodiment 3 in an intermediate focus position state.
Figure 14:
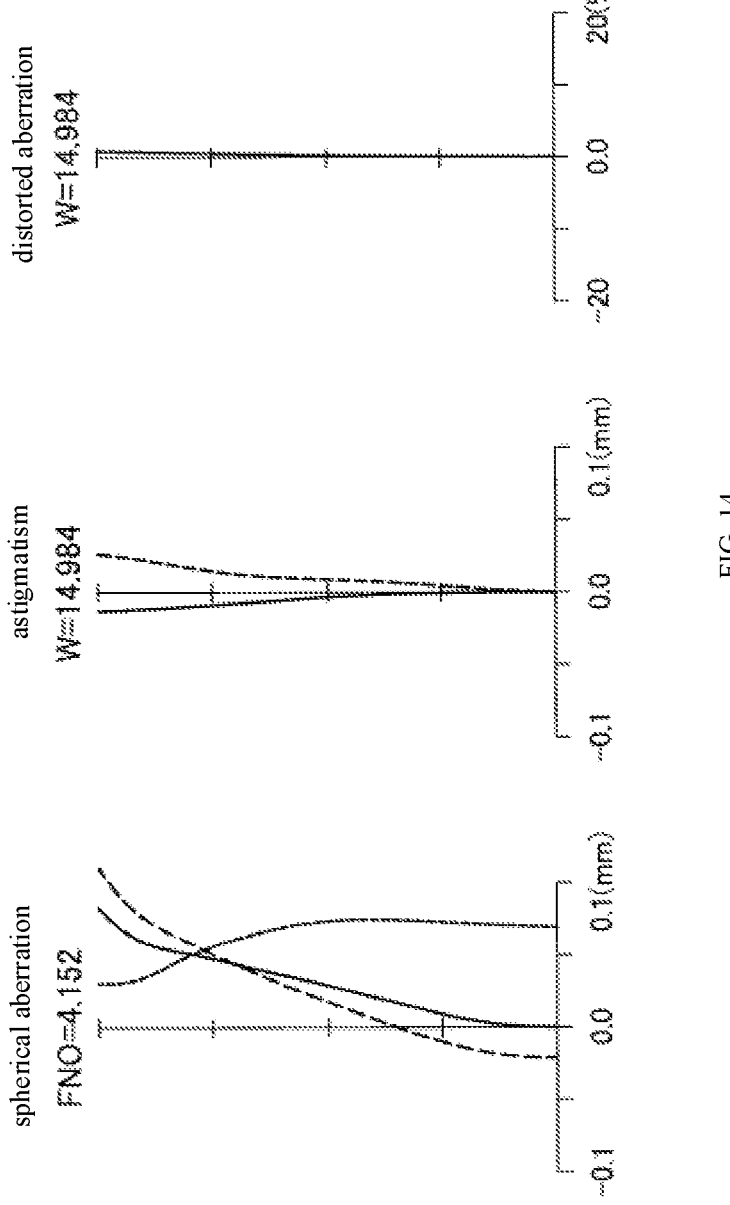
FIG. 14 is a longitudinal aberration diagram of a zoom lens according to embodiment 3 in a telephoto state.

In addition, FIG. 12 is a longitudinal aberration diagram in the wide-angle state, FIG. 13 is a longitudinal aberration diagram in the intermediate focus position state, and FIG. 14 is a longitudinal aberration diagram in the telephoto state. Table 11 below shows surface data of each lens, Table 12 shows aspheric data (an aspheric coefficient not shown is 0.00), Table 13 shows various data, Table 14 shows data of zoom lens groups, and Table 15 shows magnifications of zoom lens groups.

TABLE 11

| surface data | | | | |
|---|---|---|---|---|
| surface number | r | d | nd | vd |
| 1* | 124.688 | 0.700 | 1.8513 | 40.10 |
| 2* | 7.080 | 2.567 | | |
| 3 | 9.310 | 1.183 | 1.9229 | 20.88 |
| 4 | 13.324 | d4 | | |
| 5* | 12.643 | 5.500 | 1.5445 | 55.96 |
| 6* | 24.066 | d6 | | (aperture diaphragm) |
| 7* | 8.703 | 1.115 | 1.4971 | 81.56 |
| 8* | −20.876 | 0.200 | | |
| 9 | 4.804 | 1.507 | 1.4970 | 81.61 |
| 10 | 296.867 | 0.200 | | |
| 11 | 6.127 | 0.400 | 2.0010 | 29.13 |
| 12 | 3.452 | d12 | | |
| 13* | −11.685 | 0.961 | 1.5445 | 55.96 |
| 14* | −35.58 | d14 | | |
| 15 | ∞ | 5.000 | 2.0010 | 29.13 |
| 16 | ∞ | 0.200 | | |
| 17 | ∞ | 0.300 | 1.6168 | 64.20 |
| 18 | ∞ | 0.200 | | |

*indicates an aspheric surface

TABLE 12

| aspheric data (An aspheric coefficient not shown is 0.00.) | | | | | | | | |
|---|---|---|---|---|---|---|---|---|
| surface number | k | A4 | A6 | A8 | A10 | A12 | A14 | A16 |
| 1 | 5.0000E+00 | −2.7131E−04 | 1.3489E−05 | −4.9968E−07 | 8.8561E−09 | −5.5652E−11 | 0.0000E+00 | 0.0000E+00 |
| 2 | −9.9365E−02 | −2.9942E−04 | 1.1960E−05 | −4.2009E−07 | −4.2306E−09 | 2.9295E−10 | −1.3767E−12 | 0.0000E−00 |
| 5 | 1.7680E+00 | −9.6754E−05 | −2.7415E−06 | 7.3132E−08 | −2.9855E−08 | 1.8420E−09 | 0.0000E+00 | 0.0000E+00 |
| 6 | 1.6780E+00 | 1.7387E−04 | −6.5971E−06 | 2.6183E−06 | −3.8690E−07 | 2.2680E−08 | 0.0000E+00 | 0.0000E+00 |
| 7 | −1.3565E+00 | −5.0217E−04 | −4.4812E−05 | 1.4398E−05 | −2.0852E−06 | 1.4344E−07 | 0.0000E+00 | 0.0000E+00 |

TABLE 12-continued

| | | | | aspheric data (An aspheric coefficient not shown is 0.00.) | | | | |
|---|---|---|---|---|---|---|---|---|
| surface number | k | A4 | A6 | A8 | A10 | A12 | A14 | A16 |
| 8 | 3.0012E+00 | −5.7043E−05 | −3.5843E−05 | 1.4728E−05 | −2.4512E−06 | 2.4963E−07 | −1.2076E−08 | 6.6735E−10 |
| 13 | 4.4885E+00 | 1.4287E−03 | −1.0400E−06 | 9.8103E−00 | 2.8791E−07 | 4.5174E−07 | −1.0213E−07 | 6.6258E−09 |
| 14 | 5.0000E+00 | 1.3976E−03 | −7.0645E−05 | 1.6347E−05 | −6.0423E−06 | 1.1581E−06 | −1.2035E−07 | 5.1998E−09 |

TABLE 13

| | | various data | |
|---|---|---|---|
| | wide-angle | intermediate | telephoto |
| focal length | 5.668 | 9.658 | 14.969 |
| F number | 2.440 | 3.117 | 4.152 |
| half field angle | 38.008 | 22.997 | 14.984 |
| overall length of lens | 45.000 | 35.837 | 32.392 |
| back focal length | 4.985 | 7.429 | 9.676 |
| d4 | 13.607 | 4.445 | 1.000 |
| d6 | 6.340 | 3.578 | 0.500 |
| d12 | 3.120 | 3.441 | 4.274 |
| d14 | 1.899 | 4.341 | 6.585 |

A zoom ratio is 2.641 and an image height is 4.048.

TABLE 14

| | | data of zoom lens groups | | |
|---|---|---|---|---|
| group | starting surface | focal length | lens composition length | shift amount of lens |
| 1 | 1 | −13.481 | 4.450 | 12.603 |
| 2 | 5 | 41.627 | 5.500 | 0.000 |
| 3 | 7 | 9.903 | 3.422 | −5.844 |
| 4 | 13 | −32.275 | 0.961 | −4.691 |

TABLE 15

| | | magnifications of zoom lens groups | | |
|---|---|---|---|---|
| group | starting surface | wide-angle | intermediate | telephoto |
| 1 | 1 | 0.000 | 0.000 | 0.000 |
| 2 | 5 | 2.947 | 1.787 | 1.557 |
| 3 | 7 | −0.121 | −0.318 | −0.537 |
| 4 | 13 | 1.183 | 1.259 | 1.328 |

Embodiment 4

Figure 15A:
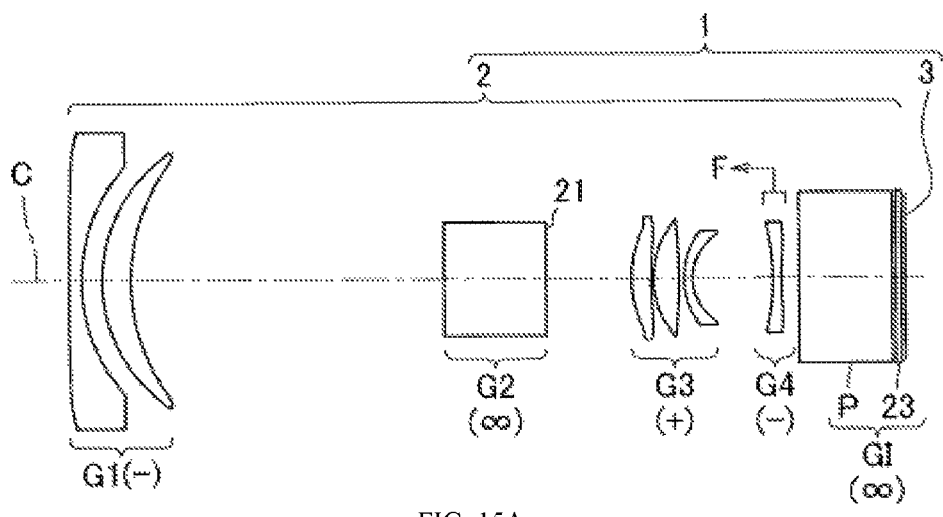
FIG. 15A is a lens structure diagram of a zoom lens according to embodiment 4 in a wide-angle state.
Figure 15B:
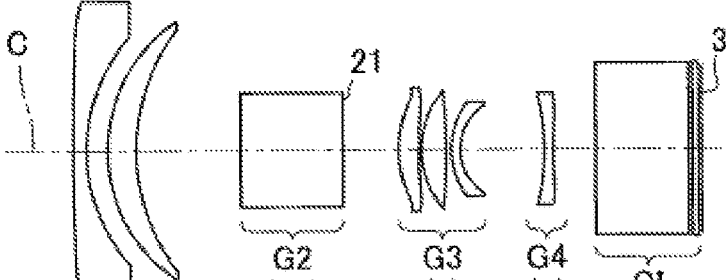
FIG. 15B is a lens structure diagram of a zoom lens according to embodiment 4 in an intermediate focus position state.
Figure 15C:
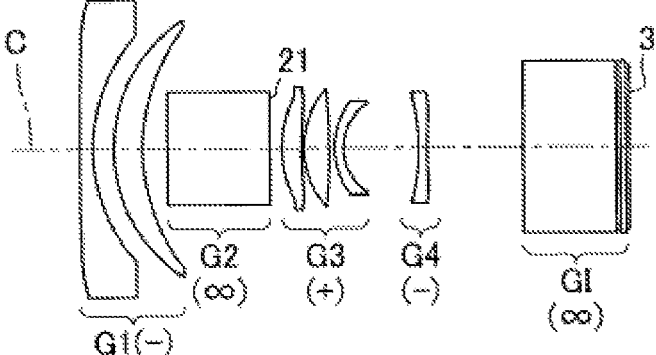
FIG. 15C is a lens structure diagram of a zoom lens according to embodiment 4 in a telephoto state.

FIGS. 15A to 15C are lens structure diagrams of the zoom lens of embodiment 4. FIG. 15A shows a wide-angle state, FIG. 15B shows an intermediate focus position state, and FIG. 15C shows a telephoto state. In addition, in FIGS. 15A to 15C, a state in which the optical axis is not bent is shown.

In addition, reference numerals representing the respective structures of the zoom lens are the same as those of the corresponding structures of the zoom lens 2 of the above implementation.

In the zoom lens of embodiment 4, the third lens group is a P-lens group, and a group including a parallel plate glass (the optical filter) arranged on the image side is an I-lens group. In addition, in the zoom lens, positions of the second lens group and the I-lens group relative to the image plane on the optical axis are fixed during zoom.

Figure 16:
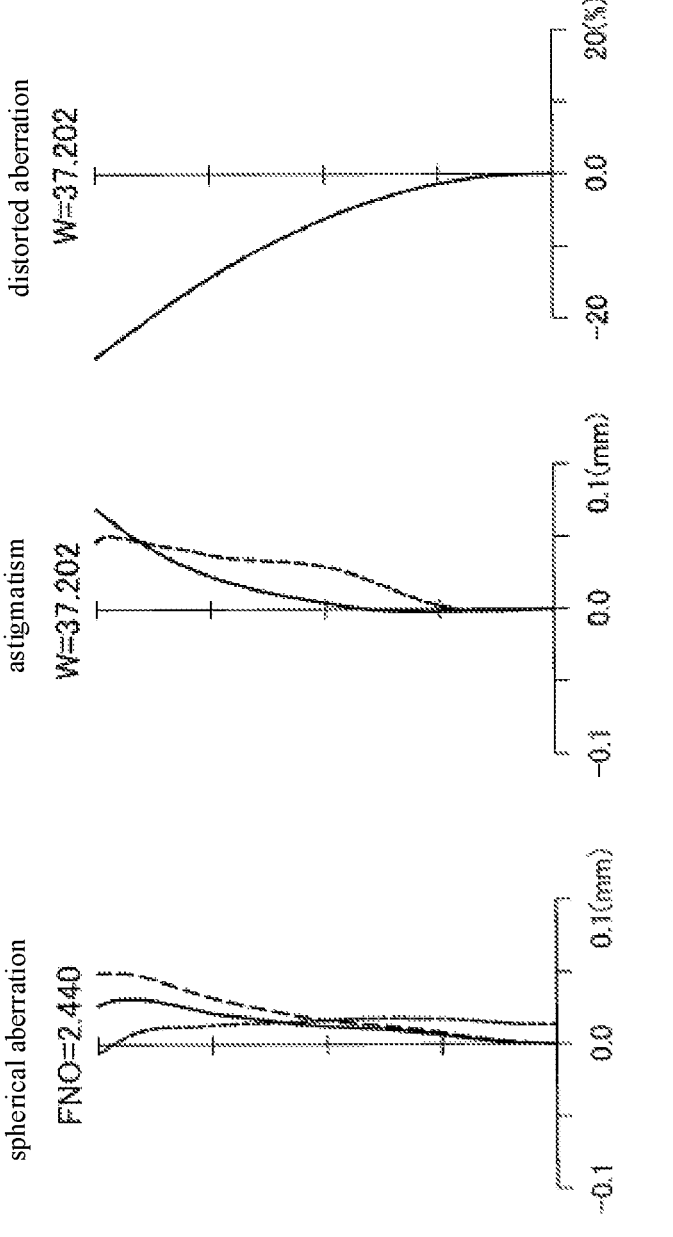
FIG. 16 is a longitudinal aberration diagram of a zoom lens according to embodiment 4 in a wide-angle state.
Figure 17:
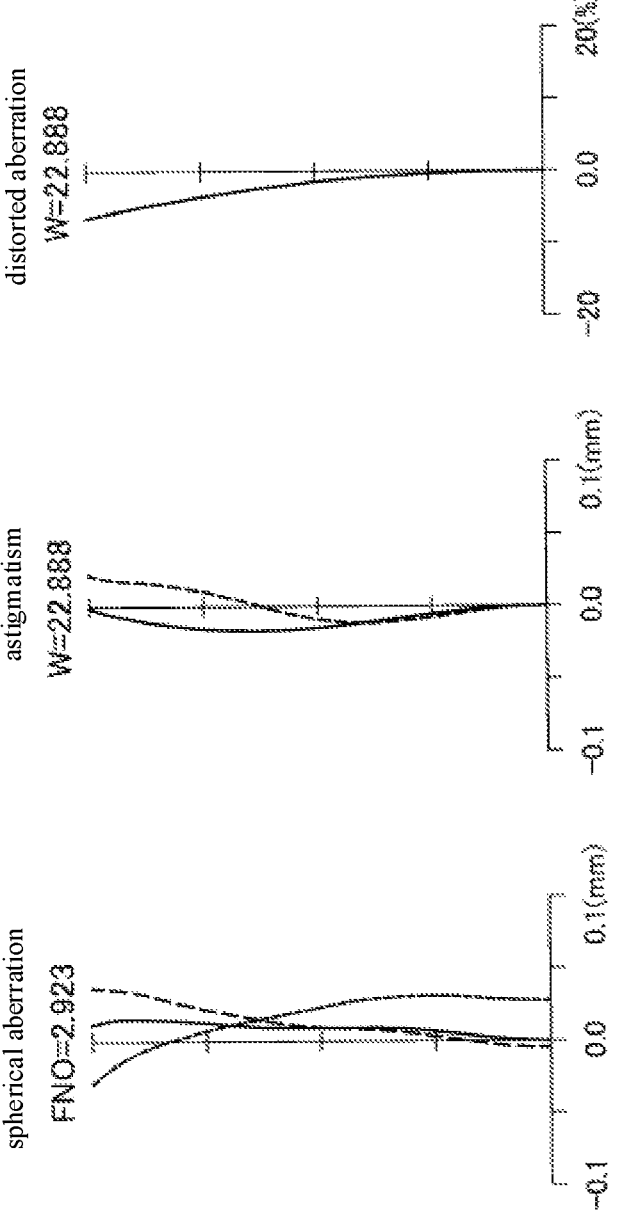
FIG. 17 is a longitudinal aberration diagram of a zoom lens according to embodiment 4 in an intermediate focus position state.
Figure 18:
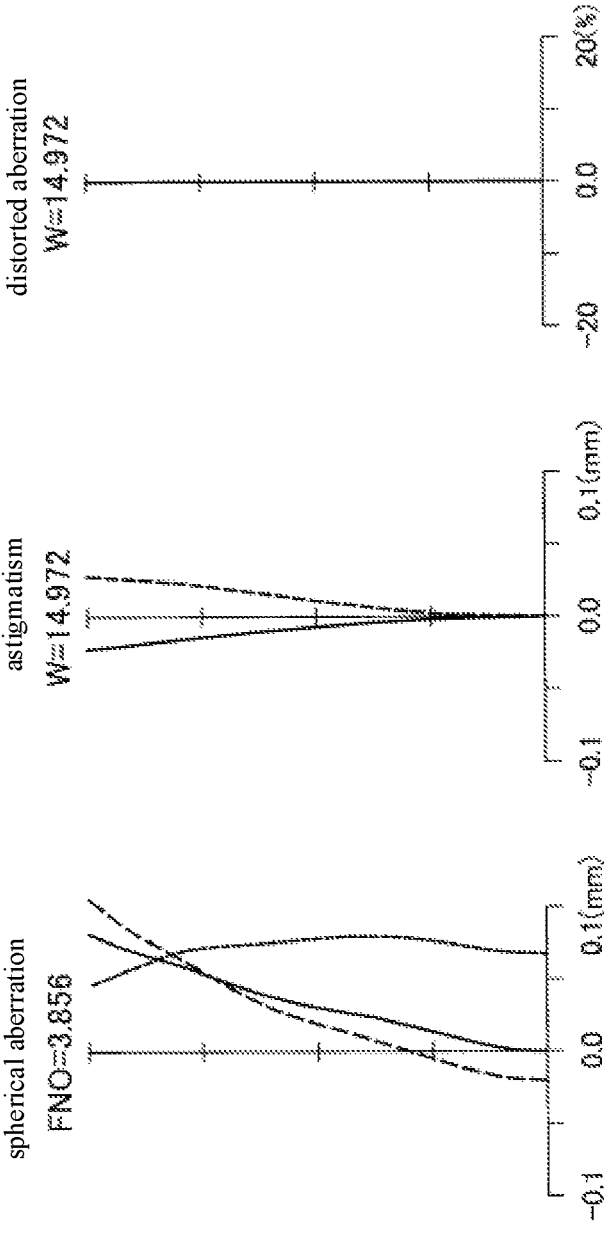
FIG. 18 is a longitudinal aberration diagram of a zoom lens according to embodiment 4 in a telephoto state.

In addition, FIG. 16 is a longitudinal aberration diagram in the wide-angle state, FIG. 17 is a longitudinal aberration diagram in the intermediate focus position state, and FIG. 18 is a longitudinal aberration diagram in the telephoto state. Table below 16 shows surface data of each lens, Table 17 shows aspheric data (an aspheric coefficient not shown is 0.00), Table 18 shows various data, Table 19 shows data of zoom lens groups, and Table 20 shows magnifications of zoom lens groups.

TABLE 16

| | | surface data | | |
|---|---|---|---|---|
| surface number | r | d | nd | vd |
| 1* | 70.881 | 0.700 | 1.8513 | 40.10 |
| 2* | 9.624 | 1.101 | | |
| 3 | 8.447 | 1.597 | 1.9229 | 20.88 |
| 4 | 10.888 | d4 | | |
| 5 | ∞ | 5.500 | 1.5445 | 55.96 |
| 6 | ∞ | d6 | | (aperture diaphragm ) |
| 7* | 5.293 | 1.051 | 1.4971 | 81.56 |
| 8* | 24.889 | 0.200 | | |
| 9 | 5.320 | 1.382 | 1.4970 | 81.61 |
| 10 | −22.560 | 0.200 | | |
| 11 | 4.432 | 0.405 | 2.0010 | 29.13 |
| 12 | 2.881 | d12 | | |
| 13* | −18.050 | 0.500 | 1.5445 | 55.96 |
| 14* | 38.459 | d14 | | |
| 15 | ∞ | 5.000 | 2.0010 | 29.13 |
| 16 | ∞ | 0.200 | | |
| 17 | ∞ | 0.300 | 1.5168 | 64.20 |
| 18 | ∞ | 0.200 | | |

*indicates an aspheric surface

TABLE 17

| | | | | aspheric data (An aspheric coefficient not shown is 0.00.) | | | | |
|---|---|---|---|---|---|---|---|---|
| surface number | k | A4 | A6 | A8 | A10 | A12 | A14 | A16 |
| 1 | −3.2116E+00 | −4.5939E−04 | 1.8571E−05 | −3.6013E−07 | 3.4940E−09 | −1.1004E−11 | 0.0000E+00 | 0.0000E+00 |
| 2 | 1.0856E+00 | −5.7508E−04 | 1.9133E−05 | −4.2330E−07 | 4.7025E−09 | −5.8173E−11 | −3.3896E−14 | 0.0000E+00 |
| 7 | −1.4841E+00 | −1.4401E−04 | −1.1530E−05 | −1.4133E−05 | 1.1884E−06 | −1.0468E−07 | 0.0000E+00 | 0.0000E+00 |
| 8 | −5.0000E+00 | 2.0317E−05 | −1.8321E−05 | −1.0113E−05 | 1.2761E−06 | −2.0262E−07 | 2.2450E−08 | −9.4268E−10 |
| 13 | 2.7158E+00 | −2.4126E−03 | 1.4084E−06 | 4.2076E−06 | 1.2196E−06 | 0.0000E+00 | 0.0000E+00 | 0.0000E+00 |
| 14 | −5.0000E+00 | −2.1342E−03 | −2.0010E−05 | 3.9600E−06 | 4.4050E−07 | 0.0000E+00 | 0.0000E+00 | 0.0000E+00 |

TABLE 18

| various data | | | |
|---|---|---|---|
| | wide-angle | intermediate | telephoto |
| focal length | 6.091 | 9.812 | 15.081 |
| F number | 2.440 | 2.923 | 3.856 |
| half field angle | 37.202 | 22.888 | 14.972 |
| overall length of lens | 45.000 | 33.779 | 29.531 |
| back focal length | 4.059 | 5.481 | 8.478 |
| d4 | 16.746 | 5.525 | 1.277 |
| d6 | 4.632 | 3.053 | 0.500 |
| d12 | 4.315 | 4.472 | 4.032 |
| d14 | 0.972 | 2.393 | 5.387 |

A zoom ratio is 2.676 and an image height is 4.048.

TABLE 19

| data of zoom lens groups | | | | |
|---|---|---|---|---|
| group | starting surface | focal length | lens composition length | shift amount of lens |
| 1 | 1 | −21.404 | 3.397 | 15.465 |
| 2 | 5 | 0.000 | 5.500 | 0.000 |
| 3 | 7 | 8.851 | 3.238 | −4.137 |
| 4 | 13 | −22.395 | 0.500 | −4.419 |

TABLE 20

| magnifications of zoom lens groups | | | | |
|---|---|---|---|---|
| group | starting surface | wide-angle | intermediate | telephoto |
| 1 | 1 | 0.000 | 0.000 | 0.000 |
| 2 | 5 | 1.000 | 1.000 | 1.000 |
| 3 | 7 | −0.239 | −0.365 | −0.508 |
| 4 | 13 | 1.190 | 1.254 | 1.387 |

Embodiment 5

Figures 19A, 19B, 19C:
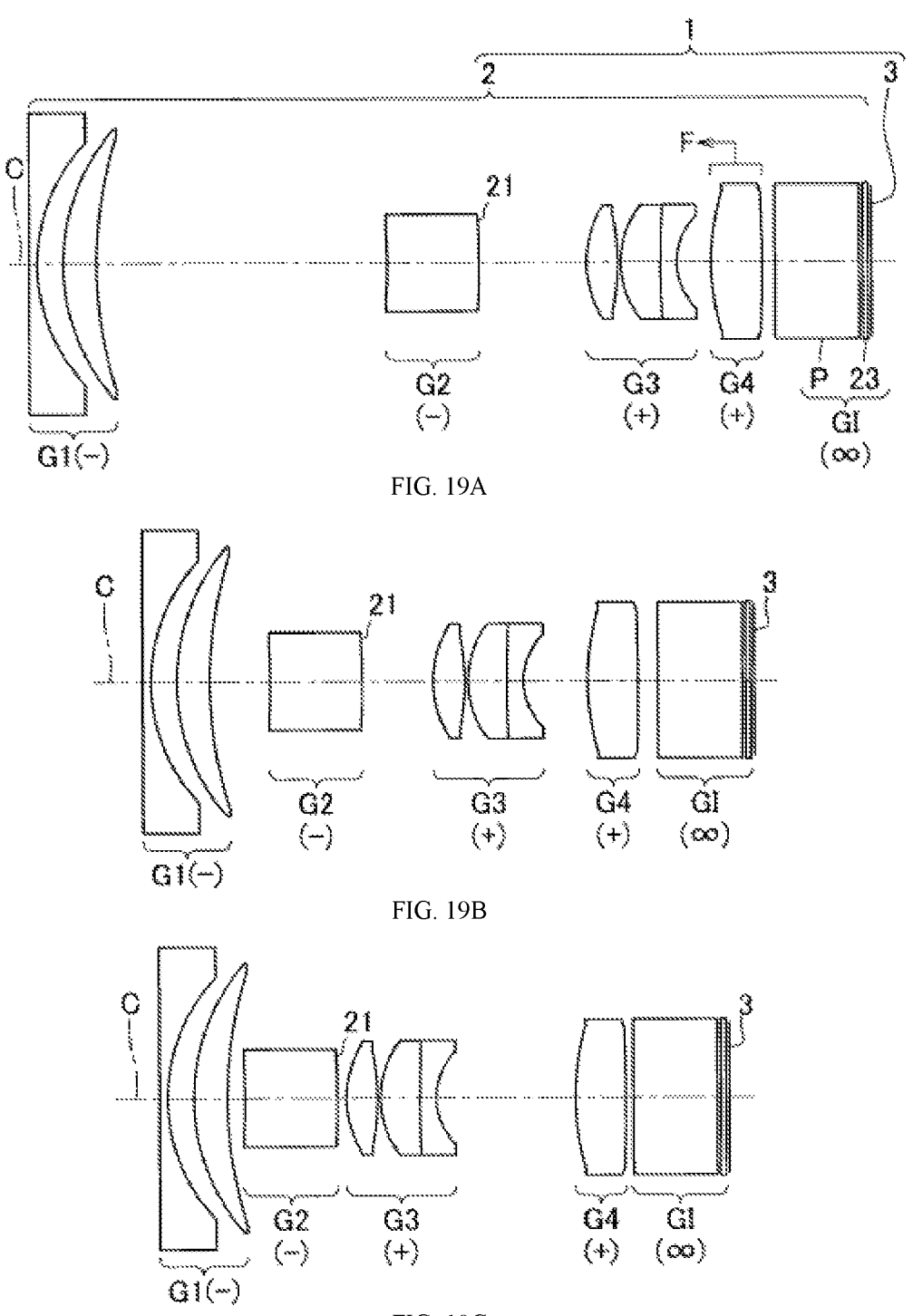
FIG. 19A is a lens structure diagram of a zoom lens according to embodiment 5 in a wide-angle state.
FIG. 19B is a lens structure diagram of a zoom lens according to embodiment 5 in an intermediate focus position state.
FIG. 19C is a lens structure diagram of a zoom lens according to embodiment 5 in a telephoto state.

FIGS. 19A to 19C are lens structure diagrams of the zoom lens of embodiment 5. FIG. 19A shows a wide-angle state, FIG. 19B shows an intermediate focus position state, and FIG. 19C shows a telephoto state. In addition, in FIGS. 19A to 19C, a state in which the optical axis is not bent is shown. In addition, reference numerals representing the respective structures of the zoom lens are the same as those of the corresponding structures of the zoom lens 2 of the above implementation.

In the zoom lens of embodiment 5, the third lens group is a P-lens group, and a group including a parallel plate glass (the optical filter) arranged on the image side is an I-lens group. In addition, in the zoom lens, positions of the second lens group and the I-lens group relative to the image plane on the optical axis are fixed during zoom.

Figure 20:
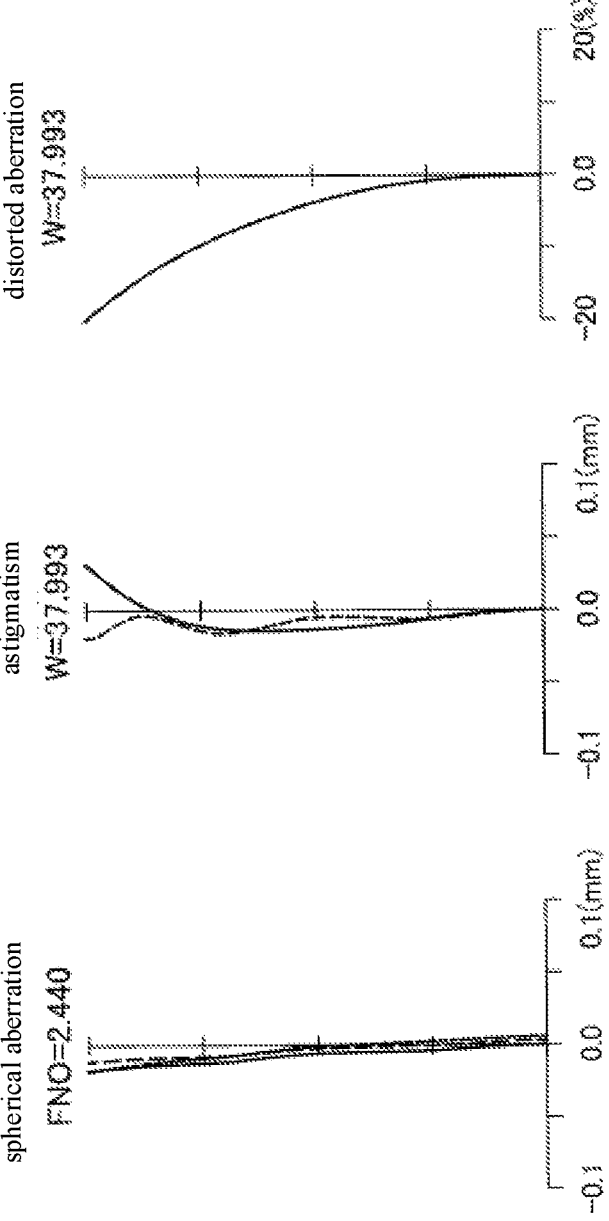
FIG. 20 is a longitudinal aberration diagram of a zoom lens according to embodiment 5 in a wide-angle state.
Figure 21:
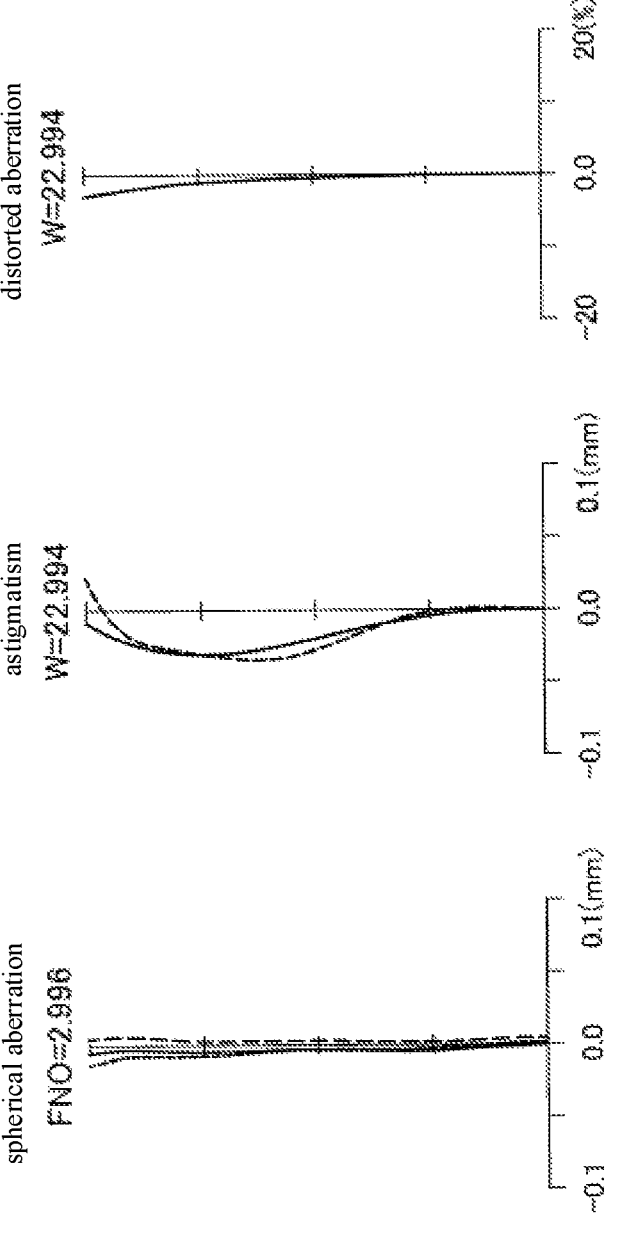
FIG. 21 is a longitudinal aberration diagram of a zoom lens according to embodiment 5 in an intermediate focus position state.
Figure 22:
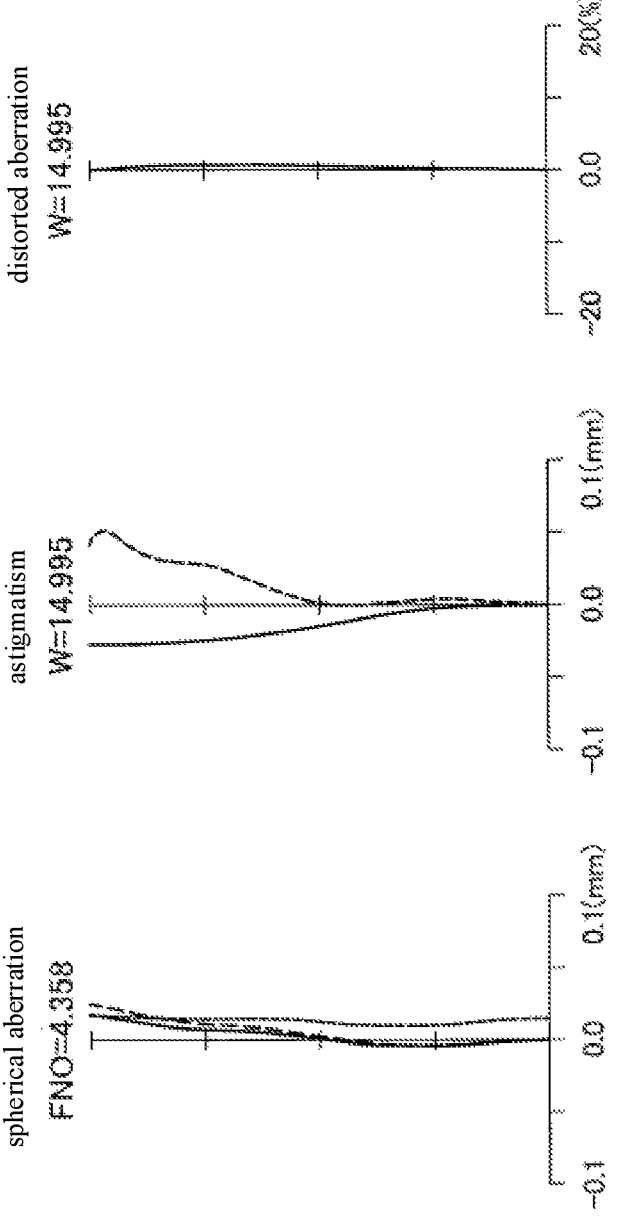
FIG. 22 is a longitudinal aberration diagram of a zoom lens according to embodiment 5 in a telephoto state.

In addition, FIG. 20 is a longitudinal aberration diagram in the wide-angle state, FIG. 21 is a longitudinal aberration diagram in the intermediate focus position state, and FIG. 22 is a longitudinal aberration diagram in the telephoto state. Table 21 below shows surface data of each lens, Table 22 shows aspheric data (an aspheric coefficient not shown is 0.00), Table 23 shows various data, Table 24 shows data of zoom lens groups, and Table 25 shows magnifications of zoom lens groups.

TABLE 21

| surface data | | | | | |
|---|---|---|---|---|---|
| surface number | r | d | nd | vd | |
| 1* | 73.189 | 0.700 | 1.8513 | 40.10 | |
| 2* | 8.875 | 1.391 | | | |
| 3 | 11.844 | 1.957 | 1.9229 | 20.88 | |
| 4 | 24.294 | d4 | | | |
| 5* | −40.344 | 5.500 | 1.5445 | 55.96 | |
| 6* | −161.762 | d6 | | | (aperture diaphragm) |
| 7* | 6.614 | 1.772 | 1.4971 | 81.56 | |
| 8* | −12.017 | 0.200 | | | |
| 9 | 5.676 | 2.457 | 1.5831 | 59.46 | |
| 10 | 45.673 | 1.000 | 1.9537 | 32.32 | |
| 11 | 3.875 | d11 | | | |
| 12* | 16.235 | 3.000 | 1.5931 | 37.65 | |
| 13* | −100.000 | d13 | | | |
| 14 | ∞ | 5.000 | 2.0010 | 29.13 | |
| 15 | ∞ | 0.200 | | | |
| 16 | ∞ | 0.300 | 1.5168 | 64.20 | |
| 17 | ∞ | 0.200 | | | |

*indicates an aspheric surface

TABLE 22

| aspheric data (An aspheric coefficient not shown is 0.00.) | | | | | | | | |
|---|---|---|---|---|---|---|---|---|
| surface number | k | A4 | A6 | AB | A10 | A12 | A14 | A16 |
| 1 | −5.0000E+00 | −3.5091E−04 | 1.0130E−05 | −1.7014E−00 | 1.4203E−00 | −4.5860E−12 | 0.0000E+00 | 0.0000E+00 |
| 2 | −2.5617E−01 | −4.0323E−04 | 1.0202E−05 | −1.3329E−07 | −5.9802E−13 | 8.6493E−12 | 1.2315E−15 | 0.0000E+00 |
| 5 | 0.0000E+00 | −3.0338E−04 | −4.9628E−06 | 1.1960E−08 | −1.3911E−07 | 8.0000E−00 | 0.0000E+00 | 0.0000E+00 |
| 6 | 0.0000E+00 | −7.8148E−05 | 1.6064E−06 | −1.4578E−08 | −1.8219E−09 | 0.0000E−00 | 0.0000E+00 | 0.0000E+00 |
| 3 | 2.7476E−02 | −2.0871E−04 | −2.3589E−05 | 1.2137E−05 | −1.4965E−06 | 9.3762E−08 | 0.0000E+00 | 0.0000E+00 |
| 8 | −4.1748E+00 | 3.2081E−04 | −3.5660E−07 | 4.5199E−04 | 3.2853E−07 | −1.322SE−07 | 1.3921E−08 | −2.7637E−10 |
| 12 | −4.5282E−00 | 6.2594E−04 | −2.8837E−05 | 2.3271E−07 | 7.5767E−08 | −1.7740E−08 | 1.6970E−09 | −5.4888E−11 |
| 13 | 5.0000E+00 | 1.0280E−03 | −1.2687E−04 | 1.6941E−05 | −1.8070E−06 | 91312E−08 | −1.3885E−09 | −2.1051E−11 |

TABLE 23

| various data | | | |
|---|---|---|---|
| | wide-angle | intermediate | telephoto |
| focal length | 5.639 | 9.589 | 14.988 |
| F number | 2.440 | 2.996 | 4.358 |
| half field angle | 37.993 | 22.994 | 14.995 |
| overall length of lens | 50.000 | 36.457 | 33.999 |
| back focal length | 3.852 | 4.308 | 3.603 |
| d4 | 17.159 | 3.617 | 1.158 |
| d6 | 6.504 | 4.288 | 0.500 |
| d11 | 1.897 | 3.657 | 8.149 |
| d13 | 0.763 | 1.219 | 0.514 |

A zoom ratio is 2.658 and an image height is 4.048.

TABLE 24

| | | data of zoom lens groups | | |
|---|---|---|---|---|
| group | starting surface | focal length | lens composition length | shift amount of lens |
| 1 | 1 | −25.413 | 4.048 | 16.002 |
| 2 | 5 | −100.316 | 5.500 | 0.000 |
| 3 | 7 | 10.597 | 5.429 | −6.004 |
| 4 | 12 | 24.604 | 3.000 | 0.249 |

TABLE 25

| | | magnifications of zoom lens groups | | |
|---|---|---|---|---|
| group | starting surface | wide-angle | intermediate | telephoto |
| 1 | 1 | 0.000 | 0.000 | 0.000 |
| 2 | 5 | 0.694 | 0.765 | 0.780 |
| 3 | 7 | −0.412 | −0.651 | −0.962 |
| 4 | 12 | 0.775 | 0.756 | 0.786 |

Embodiment 6

FIGS. 23A to 23C are lens structure diagrams of the zoom lens of embodiment 6. FIG. 23A shows a wide-angle state, FIG. 23B shows an intermediate focus position state, and FIG. 23C shows a telephoto state. In addition, in FIGS. 23A to 23C, a state in which the optical axis is not bent is shown. In addition, reference numerals representing the respective structures of the zoom lens are the same as those of the corresponding structures of the zoom lens 2 of the above implementation.

TABLE 26

| | | surface data | | | |
|---|---|---|---|---|---|
| surface number | r | d | nd | vd | |
| 1* | 113.599 | 0.700 | 1.8513 | 40.10 | |
| 2* | 8.716 | 2.298 | | | |
| 3 | 9.660 | 1.452 | 1.9229 | 20.88 | |
| 4 | 14.162 | d4 | | | |
| 5* | 14.773 | 5.500 | 1.5445 | 55.96 | |
| 6* | 10.099 | d6 | | | (aperture diaphragm) |
| 7* | 8.333 | 1.281 | 1.4971 | 81.56 | |
| 8* | −11.524 | 0.200 | | | |
| 9 | 4.674 | 1.201 | 1.4970 | 81.61 | |
| 10 | 38.556 | 0.200 | | | |
| 11 | 5.340 | 0.436 | 2.0010 | 29.13 | |
| 12 | 3.351 | d12 | | | |
| 13* | −14.101 | 1.000 | 1.5445 | 55.96 | |
| 14* | 1402.384 | d14 | | | |
| 15 | ∞ | 5.000 | 2.0010 | 29.13 | |
| 16 | ∞ | 0.200 | | | |
| 17 | ∞ | 0.300 | 1.5168 | 64.20 | |
| 18 | ∞ | 0.200 | | | |

*indicates an aspheric surface

TABLE 27

| | | | | aspheric data (An aspheric coefficient not shown is 0.00.) | | | | |
|---|---|---|---|---|---|---|---|---|
| surface number | k | A4 | A6 | A8 | A10 | A12 | A14 | A16 |
| 1 | −5.0000E+00 | −1.6004E−04 | 1.8279E−06 | −4.2421E−09 | 0.0000E+00 | 0.0000E+00 | 0.0000E+00 | 0.0000E+00 |
| 2 | −1.7689E−01 | −1.5632E−04 | 1.0867E−06 | −1.3551E−08 | 8.2427E−10 | 0.0000E+00 | 0.0000E+00 | 0.0000E+00 |
| 5 | 0.0000E+00 | −2.1533E−04 | −6.1094E−06 | 3.7288E−07 | −4.7140E−08 | 0.0000E+00 | 0.0000E+00 | 0.0000E+00 |
| 6 | 0.0000E+00 | −4.5982E−04 | −1.8040E−06 | −6.1822E−08 | 2.0835E−08 | 0.0000E+00 | 0.0000E+00 | 0.0000E+00 |
| 7 | −1.8182E+00 | −8.1148E−04 | 1.7247E−85 | −1.3823E−08 | 1.8483E−06 | −1.1962E−07 | 0.0000E+00 | 0.0000E+00 |
| 8 | 2.8397E+00 | −1.2304E−04 | 1.0564E−06 | −6.0967E−08 | −2.1434E−66 | 5.1454E−07 | −5.1728E−08 | 1.7133E−09 |
| 13 | −4.9501E−00 | −5.0508E−04 | 8.9321E−06 | 5.2016E−04 | −2.8232E−07 | 0.0000E+00 | 0.0000E+00 | 0.0000E+00 |
| 14 | 5.0000E+00 | 3.5425E−05 | −1.9819E−05 | 4.2025E−06 | −2.3054E−07 | 0.0000E+00 | 0.0000E+00 | 0.0000E+00 |

In the zoom lens of embodiment 6, the third lens group is a P-lens group, and a group including a parallel plate glass (the optical filter) arranged on the image side is an I-lens group. In addition, in the zoom lens, positions of the second lens group and the I-lens group relative to the image plane on the optical axis are fixed during zoom.

In addition, FIG. 24 is a longitudinal aberration diagram in the wide-angle state, FIG. 25 is a longitudinal aberration diagram in the intermediate focus position state, and FIG. 26 is a longitudinal aberration diagram in the telephoto state. Table 26 below shows surface data of each lens, Table 27 shows aspheric data (an aspheric coefficient not shown is 0.00), Table 28 shows various data, Table 29 shows data of zoom lens groups, and Table 30 shows magnifications of zoom lens groups.

TABLE 28

| | various data | | |
|---|---|---|---|
| | wide-angle | intermediate | telephoto |
| focal length | 5.752 | 9.740 | 15.068 |
| F number | 2.440 | 3.091 | 4.292 |
| half field angle | 37.979 | 22.997 | 14.989 |
| overall length of lens | 45.000 | 34.467 | 31.222 |
| back focal length | 4.066 | 5.425 | 6.430 |
| d4 | 14.818 | 4.285 | 1.040 |
| d6 | 5.054 | 3.054 | 0.500 |
| d12 | 4.183 | 4.823 | 6.373 |
| d14 | 0.977 | 2.337 | 3.341 |

A zoom ratio is 2.620 and an image height is 4.048.

TABLE 29

| | | | data of zoom lens groups | |
| group | starting surface | focal length | lens composition length | shift amount of lens |
|---|---|---|---|---|
| 1 | 1 | −19.190 | 4.450 | 13.778 |
| 2 | 5 | −100.176 | 5.500 | 0.000 |
| 3 | 7 | 7.731 | 3.318 | −4.554 |
| 4 | 13 | −25.632 | 1.000 | −2.364 |

TABLE 30

| | | magnifications of zoom lens groups | | |
| group | starting surface | wide-angle | intermediate | telephoto |
|---|---|---|---|---|
| 1 | 1 | 0.000 | 0.000 | 0.000 |
| 2 | 5 | 0.638 | 0.684 | 0.699 |
| 3 | 7 | −0.397 | −0.600 | −0.881 |
| 4 | 13 | 1.184 | 1.237 | 1.276 |

Values of the above embodiments 1 to 6 corresponding to formulas (1) to (6) of the above implementation are shown in Table 31 below.

TABLE 31

| | value corresponding to conditional formula | | | | | |
| | embodiment 1 | embodiment 2 | embodiment 3 | embodiment 4 | embodiment 5 | embodiment 6 |
|---|---|---|---|---|---|---|
| conditional formula (1) | −2.995 | −3.912 | −2.378 | −3.514 | −4.506 | −3.336 |
| conditional formula (2) | 1.367 | 1.252 | 1.075 | 0.923 | 1.153 | 0.830 |
| conditional formula (3) | 1.212 | 1.678 | 1.368 | 1.614 | 1.740 | 1.480 |
| conditional formula (4) | −1.074 | −1.921 | −1.361 | −2.418 | −2.398 | −2.482 |
| conditional formula (5) | 0.430 | 0.999 | 0.595 | 1.165 | 1.138 | 1.180 |
| conditional formula (6) | 1.367 | 0.000 | 0.221 | 0.000 | −0.092 | −0.093 |
| fw | 5.668 | 5.665 | 5.668 | 6.091 | 5.639 | 5.752 |
| ft | 15.086 | 14.992 | 14.969 | 15.081 | 14.988 | 15.068 |
| f1 | −13.575 | −22.1611 | −13.481 | −21.404 | −25.413 | −19.190 |
| f2 | 43.812 | 0.000 | 41.627 | 0.000 | −100.316 | −100.176 |
| fP | 12.643 | 11.538 | 9.903 | 8.851 | 10.597 | 7.731 |
| m1 | 11.209 | 15.463 | 12.603 | 15.465 | 16.002 | 13.778 |
| mP | −6.896 | −6.287 | −5.844 | −4.137 | −6.004 | −4.554 |
| bPw | −0.221 | −0.330 | −0.121 | −0.239 | −0.412 | −0.397 |
| bPt | −1.368 | −0.874 | −0.537 | −0.508 | −0.962 | −0.881 |

Problems to be Solved by the Present Disclosure

Therefore, a subject of the present disclosure is to provide a zoom lens and a camera device with the zoom lens which can realize a wide-angle while achieving a thin configuration and miniaturization during retraction.

Solutions to Solve the Problems

The zoom lens of the present disclosure is a zoom lens configured to be retractable. The zoom lens sequentially has: a first lens group, a second lens group and a P-lens group from an object side to an image side along an optical axis, the first lens group has a negative refractive power, and second lens group has a reflective optical element bending the optical axis. During retraction, the second lens group moves along the optical axis to the image side, and at least a part of the first lens group is retracted into a space generated by the movement of the second lens group.

The P-lens group has a positive refractive power. When zooming from a wide-angle state to a telephoto state, at least the first lens group in the first lens group and the second lens group moves along the optical axis to reduce a spacing with the second lens group; the P-lens group moves to reduce a spacing with the second lens group; a position of the second lens group relative to an image plane on the optical axis may be fixed.

The zoom lens has an I-lens group. The I-lens group is arranged closer to the image side than the P-lens group, and when zooming from the wide-angle state to the telephoto state, a position of the I-lens group relative to the image plane on the optical axis being fixed. The I-lens group further has a reflective optical element, and the reflective optical element is arranged on the object side of the image plane of the zoom lens and bends the optical axis.

In addition, in the zoom lens, when a focal length of the first lens group is set to f1 and a focal length of the wide-angle state is set to fw, the following may be satisfied: $-6.000 \le f1/fw \le -1.500$.

In addition, in the zoom lens, when a focal length of the P-lens group is set to fp, the focal length of the wide-angle state is set to fw, and the focal length of the telephoto state is set to ft, the following may be satisfied: $0.500 \le fP/\sqrt{(fw \times ft)} \le 2.500$.

In addition, in the zoom lens, when a shift amount (a shift towards the image side being defined as positive) of the first lens group from the wide-angle state to the telephoto state is set to m1, the focal length of the wide-angle state is set to fw, and the focal length of the telephoto state is set to ft, the following may be satisfied: $0.800 \le m1/\sqrt{(fw \times ft)} \le 2.500$.

In addition, in the zoom lens, when the focal length of the first lens group is set to f1 and the focal length of the P-lens group is set to fp, the following may be satisfied: $-5.000 \le f1/fP \le -0.500$.

In addition, in the zoom lens, when the focal length of the telephoto state is set to ft, the focal length of the wide-angle state is set to fw, a lateral magnification of the P-lens group in infinity focus at the telephoto state is set to bPt, and a lateral magnification of the P-lens group in infinity focus at the wide-angle state is set to bPw, the following may be satisfied: $0.200 \le |(ft/fw)/(bPt/bPw)| \le 4.000$.

In addition, in the zoom lens, when the focal length of the wide-angle state is set to fw, the focal length of the telephoto state is set to ft, and a focal length of the second lens group is set to f2, the following may be satisfied: $-1.000 \le \sqrt{(fw \times ft)}/f2 \le 2.000$.

In addition, the camera device of the present disclosure has: a zoom lens of any one of the above-described, and an imaging element arranged at an image plane position of the zoom lens.

Although the present disclosure has been appropriately and fully described by means of implementations with reference to the accompanying drawings in order to represent the present disclosure, those skilled in the art should recognize that it is easy to change and/or improve the above implementations.

REFERENCE NUMERALS

1: camera device
2: zoom lens
22: lens barrel
23: optical filter
3: imaging element
4: liquid crystal display
100: camera device
101: zoom optical system
102: first lens group
103: second lens group
104: third lens group
105: low pass filter
200: camera device
201: zoom optical system
202: first lens group
202A: reflective prism
203: second lens group
204: third lens group
205: fourth lens group
205A: reflective prism
300: camera device
301: zoom optical system
302: first lens group
303: second lens group
304: reflective prism
305: subsequent lens group
C, C1, C2, C3: optical axis
F: focus lens group
G1: first lens group
G2: second lens group
G3: third lens group (P-lens group)
G4: fourth lens group
GI: I-lens group
P: reflective optical element
S: Space
Se: imaging element

What is claimed is:

1. A zoom lens, the zoom lens being retractable, and comprising:
a first lens group, a second lens group and a P-lens group sequentially from an object side to an image side along an optical axis,
wherein the first lens group comprises a negative refractive power;
the second lens group comprises a reflective optical element bending the optical axis; and
during non-zooming retraction, the second lens group moves along the optical axis to the image side, and at least a part of the first lens group is retracted into a space generated by the movement of the second lens group,
wherein the P-lens group comprises a positive refractive power; and when zooming from a wide-angle state to a telephoto state, the first lens group moves along the optical axis to reduce a spacing with the second lens group, the P-lens group moves to reduce a spacing with the second lens group, and a position of the second lens group relative to an image plane on the optical axis is fixed,
wherein a focal length of the telephoto state is set to ft, a focal length of the wide-angle state is set to fw, a lateral magnification of the P-lens group in infinity focus at the telephoto state is set to bPt, and a lateral magnification of the P-lens group in infinity focus at the wide-angle state is set to bPw, satisfying:

$$0.200 \leq |(ft/fw)/(bPt/bPw)| \leq 4.000.$$

2. The zoom lens according to claim 1, further comprising:
an I-lens group arranged closer to the image side than the P-lens group, and when zooming from the wide-angle state to the telephoto state, a position of the I-lens group relative to the image plane on the optical axis being fixed, and
wherein the I-lens group comprises a reflective optical element, and the reflective optical element is arranged on the object side of the image plane of the zoom lens and bends the optical axis.

3. The zoom lens according to claim 1, wherein:
a focal length of the first lens group is set to f1 and a focal length of the wide-angle state is set to fw, satisfying:

$$-6.000 \leq f1/fw \leq -1.500.$$

4. The zoom lens according to claim 1, wherein:
a focal length of the P-lens group is set to fP, the focal length of the wide-angle state is set to fw, and the focal length of the telephoto state is set to ft, satisfying:

$$0.500 \leq fP/\sqrt{(fw \times ft)} \leq 2.500.$$

5. The zoom lens according to claim 1, wherein:
a shift towards the image side is defined as positive, a shift amount of the first lens group from the wide-angle state to the telephoto state is set to m1, a focal length of the wide-angle state is set to fw, and a focal length of the telephoto state is set to ft, satisfying:

$$0.800 \leq m1/(fw \times ft) \leq 2.500.$$

6. The zoom lens according to claim 1, wherein:
a focal length of the first lens group is set to f1 and a focal length of the P-lens group is set to fP, satisfying:

$$-5.000 \leq f1/fP \leq -0.500.$$

7. The zoom lens according to claim 1, wherein:
a focal length of the wide-angle state is set to fw, a focal length of the telephoto state is set to ft, and a focal length of the second lens group is set to f2, satisfying:

$$-1.000 \leq \sqrt{(fw \times ft)}/f2 \leq 2.000.$$

8. A camera device, comprising:
a zoom lens, the zoom lens being retractable, and comprising a first lens group, a second lens group and a P-lens group sequentially from an object side to an image side along an optical axis, wherein the first lens group comprises a negative refractive power; the second lens group comprises a reflective optical element bending the optical axis; and during non-zooming retraction, the second lens group moves along the optical axis to the image side, and at least a part of the first lens group is retracted into a space generated by the movement of the second lens group; and
an imaging element arranged at an image plane position of the zoom lens,
wherein the P-lens group comprises a positive refractive power; and when zooming from a wide-angle state to a telephoto state, the first lens group moves along the optical axis to reduce a spacing with the second lens group, the P-lens group moves to reduce a spacing with the second lens group, and a position of the second lens group relative to an image plane on the optical axis is fixed, wherein a focal length of the telephoto state is set to ft, a focal length of the wide-angle state is set to fw, a lateral magnification of the P-lens group in infinity focus at the telephoto state is set to bPt, and a lateral magnification of the P-lens group in infinity focus at the wide-angle state is set to bPw, satisfying:

$$0.200 \leq |(ft/fw)/(bPt/bPw)| \leq 4.000.$$

9. The zoom lens according to claim 1, further comprising:

an aperture diaphragm arranged on the image side of the second lens group, and a lens barrel holding the first lens group and configured to extend to the object side when imaging, and to retract when imaging is not performed.

10. The zoom lens according to claim 1, wherein the reflective optical element of the second lens group is a prism or a mirror.

11. The zoom lens according to claim 2, wherein the reflective optical element of the I-lens group is a prism or a mirror.

12. The zoom lens according to claim 2, wherein the I-lens group further comprises an optical filter arranged on the image side of the reflective optical element of the I-lens group.

13. The zoom lens according to claim 3, wherein $-5.500 \leq f1/fw \leq -1.700$.

14. The zoom lens according to claim 4, wherein $0.650 \leq fP/\sqrt{(fw \times ft)} \leq 2.000$.

15. The zoom lens according to claim 5, wherein $0.900 \leq m1/\sqrt{(fw \times ft)} \leq 2.000$.

16. The zoom lens according to claim 6, wherein $-4.000 \leq f1/fP \leq -0.700$.

17. The zoom lens according to claim 1, wherein $0.300 \leq |(ft/fw)/(bPt/bPw)| \leq 3.000$.

18. The zoom lens according to claim 7, wherein $-0.500 \leq \sqrt{(fw \times ft)}/f2 \leq 1.750$.

* * * * *